US008747572B2

(12) United States Patent
Ohki

(10) Patent No.: US 8,747,572 B2
(45) Date of Patent: Jun. 10, 2014

(54) CARBONITRIDING METHOD, MACHINERY COMPONENT FABRICATION METHOD, AND MACHINERY COMPONENT

(75) Inventor: Chikara Ohki, Kuwana (JP)

(73) Assignee: NTN Corporation, Osaka (JP)

( * ) Notice: Subject to any disclaimer, the term of this patent is extended or adjusted under 35 U.S.C. 154(b) by 1689 days.

(21) Appl. No.: 12/085,556

(22) PCT Filed: Sep. 15, 2006

(86) PCT No.: PCT/JP2006/318378
§ 371 (c)(1),
(2), (4) Date: May 27, 2008

(87) PCT Pub. No.: WO2007/066441
PCT Pub. Date: Jun. 14, 2007

(65) Prior Publication Data
US 2009/0165896 A1  Jul. 2, 2009

(30) Foreign Application Priority Data

Dec. 8, 2005  (JP) ................. 2005-354876
Dec. 22, 2005 (JP) ................. 2005-369670

(51) Int. Cl.
*C23C 8/00* (2006.01)
*C23C 22/00* (2006.01)

(52) U.S. Cl.
USPC .......................... 148/218; 148/318

(58) Field of Classification Search
USPC ................................. 148/218, 318
See application file for complete search history.

(56) References Cited

U.S. PATENT DOCUMENTS 5,456,766 A  10/1995  Beswick et al.

FOREIGN PATENT DOCUMENTS

| DE | 39 35 486 A1 | 6/1990 |
| EP | 0 626 468 A1 | 11/1994 |
| JP | 51-149135 A | 12/1976 |
| JP | 51-149136 A | 12/1976 |
| JP | 57-016164 A | 1/1982 |
| JP | 05-118336 | 5/1993 |

(Continued)

OTHER PUBLICATIONS

Japanese Office Action, with English translation, issued in Japanese Patent Application No. JP 2005-354876, mailed Aug. 26, 2008.

(Continued)

*Primary Examiner* — Keith Walker
*Assistant Examiner* — Alexander Polyansky
(74) *Attorney, Agent, or Firm* — McDermott Will & Emery LLP

(57) ABSTRACT

A carbonitriding method that allows the permeating rate of nitrogen to be increased to improve the efficiency of the carbonitriding process is directed to carbonitriding a workpiece formed of steel containing at least 0.8 mass % of carbon, including an atmosphere control step of controlling the atmosphere in a heat treatment furnace, and a heating pattern control step of controlling the temperature history applied to a workpiece. The atmosphere control step includes an undecomposed ammonia concentration control step of controlling the undecomposed ammonia concentration in the heat treatment furnace, and a partial pressure control step of controlling the partial pressure of at least one of carbon monoxide and carbon dioxide in the heat treatment furnace. In the atmosphere control step, the undecomposed ammonia concentration control step and partial pressure control step are carried out such that the $\gamma$ value defined by $\gamma = a_C/C_N$, where $a_C$ is an activity of carbon in said workpiece and $C_N$ is the undecomposed ammonia concentration in said heat treatment furnace, is within the range of at least 2 and not more than 5.

4 Claims, 12 Drawing Sheets

(56) References Cited

FOREIGN PATENT DOCUMENTS

| JP | 7-173602 | 7/1995 |
| JP | 8-13125 | 1/1996 |
| JP | 08-013125 | 1/1996 |
| JP | 2001-011597 | 1/2001 |
| JP | 2002-069609 | 3/2002 |
| WO | WO 2004/044248 A1 | 5/2004 |

OTHER PUBLICATIONS

European Search Report issued in European Patent Application No. 06798041.7-1215, mailed Jan. 25, 2010.
Japanese Office Action, w/ English translation thereof, issued in Japanese Patent Application No. JP 2005-369670 dated Feb. 10, 2009.
Tsunekawa, Y., et al., "Void Formation and Nitrogen Diffusion on Gas Carbonitriding", Heat Treatment, vol. 25, No. 5, 1985, pp. 242-247 with its partial English translation.

CARBONITRIDING METHOD, MACHINERY COMPONENT FABRICATION METHOD, AND MACHINERY COMPONENT

RELATED APPLICATIONS

This application is the U.S. National Phase under 35 U.S.C. §371 of International Application No. PCT/JP2006/318378, filed on Sep. 15, 2006, which in turn claims the benefit of Japanese Application No. 2005-354876, filed on Dec. 8, 2005 and Japanese Application No. 2005-369670, filed on Dec. 22, 2005, the disclosures of which Applications are incorporated by reference herein.

TECHNICAL FIELD

The present invention relates to a carbonitriding method, a fabrication method of a machinery component, and a machinery component. More particularly, the present invention relates to a carbonitriding method for carbonitriding a workpiece formed of steel, a fabrication method of a machinery component including the step of carbonitriding a workpiece formed of steel, and a steel machinery component subjected to carbonitriding.

BACKGROUND ART

Generally in a carbonitriding process, particularly in a gas carbonitriding process applied to a workpiece formed of steel, the atmosphere in a heat treatment furnace is controlled by introducing RX gas and ammonia ($NH_3$) gas into the heat treatment furnace at a constant flow rate (supplied amount per unit time), and adjusting the carbon potential ($C_P$) value in the heat treatment furnace based on the partial pressure of carbon dioxide ($CO_2$) in the heat treatment furnace. It is difficult to directly measure the amount of nitrogen permeating into the surface layer of the workpiece during the carbonitriding process. In most cases, the amount of nitrogen permeating into the surface layer of the workpiece is controlled by adjusting the flow rate of ammonia gas that can be directly measured during a carbonitriding process, subsequent to empirically determining the relationship between the flow rate of ammonia gas and the amount of nitrogen permeating into the surface layer of a workpiece from past records of actual production in association with each heat treatment furnace.

The flow rate of ammonia gas is determined empirically, taking into account the mass, configuration and the like of the workpiece, based on the past records of actual production with respect to each heat treatment furnace. In the case where a workpiece of an amount or configuration whose records of actual production are not available is to be subjected to a carbonitriding process, the optimum flow rate of ammonia gas in the relevant carbonitriding process must be determined by trial and error. It is therefore difficult to render the quality of the workpiece stable until the optimum ammonia gas flow rate is determined. Moreover, since the trial and error must be carried out at the production line, work pieces that do not meet the required quality will be produced, leading to the possibility of increasing the production cost.

There is proposed a method of controlling the amount of nitrogen permeating into the workpiece by adjusting the undecomposed ammonia concentration (the concentration of residual ammonia gas) that is the concentration of gaseous ammonia remaining in the heat treatment furnace (Yoshihito Tsunekawa et al. "Void Formation and Nitrogen Diffusion on Gas Carbonitriding" Heat Treatment, 1985, Vol. 25, No. 5, pp. 242-247 (Non-Patent Document 1) and Japanese Patent Laying-Open No. 8-013125 (Patent Document 1)), instead of controlling the flow rate of ammonia gas that varies depending upon the configuration of the heat treatment furnace, as well as upon the amount and configuration of each workpiece. Specifically, the undecomposed ammonia concentration that can be measured during a carbonitriding process is identified, and the flow rate of ammonia gas is adjusted based on the relationship between the undecomposed ammonia concentration and the amount of nitrogen permeating into the workpiece, which can be determined irrespective of the configuration of the heat treatment furnace and/or the amount and configuration of the workpiece. It is therefore possible to control the amount of nitrogen permeating into the workpiece without having to determine the optimum ammonia gas flow rate by trial and error. Therefore, the quality of the workpiece can be stabilized.

Non-Patent Document 1: Yoshiki Tsunekawa et al. "Void Formation and Nitrogen Diffusion on Gas Carbonitriding" Heat Treatment, 1985, Vol. 25, No. 5, pp. 242-247

Patent Document 1: Japanese Patent Laying-Open No. 8-013125

DISCLOSURE OF THE INVENTION

Problems to be Solved by the Invention

However, conventional carbonitriding process methods including the aforementioned carbonitriding method based on the undecomposed ammonia concentration as a parameter are disadvantageous in that the permeating rate of nitrogen into the workpiece (the amount of nitrogen permeating into the surface of the workpiece per unit area per unit time) cannot be readily controlled. The carbonitriding process is one step that is relatively high in cost in the fabrication steps of a machinery component. Therefore, there is a demand for reducing the cost of the carbonitriding process. This demand can be met if the permeating rate of nitrogen can be increased to improve the efficiency of the carbonitriding process by controlling the permeating rate of nitrogen to the workpiece.

In view of the foregoing, an object of the present invention is to provide a carbonitriding method that allows the permeating rate of nitrogen to be increased to improve the efficiency of the carbonitriding process. Another object of the present invention is to provide a fabrication method of a machinery component that allows the fabrication cost to be reduced by implementing an effective carbonitriding process. A further object of the present invention is to provide a machinery component with reduced fabrication cost by implementing an effective carbonitriding process.

Means for Solving the Problems

According to an aspect of the present invention, a carbonitriding method is directed to carbonitriding a workpiece formed of steel containing at least 0.8 mass % of carbon. The carbonitriding method according to an aspect of the present invention includes an atmosphere control step of controlling the atmosphere in a heat treatment furnace, and a heating pattern control step of controlling a temperature history applied to a workpiece in the heat treatment furnace. The atmosphere control step includes an undecomposed ammonia concentration control step of controlling the undecomposed ammonia concentration in the heat treatment furnace, and a partial pressure control step of controlling the partial pressure of at least one of carbon monoxide and carbon dioxide in the heat treatment furnace. In the atmosphere control step, the undecomposed ammonia concentration control step and the partial pressure control step are carried out such that the value of γ defined by $\gamma = a_C/C_N$, where $a_C$ is a carbon activity in the workpiece and $C_N$ is the undecomposed ammonia concentration in the heat treatment furnace, is in a range of at least 2 and not more than 5.

The inventor studied in detail the relationship between the atmosphere in the heat treatment furnace and the permeating behavior of nitrogen into the workpiece. The inventor focused on the fact that not only the undecomposed ammonia amount in the atmosphere in the heat treatment furnace, but also the carbon activity defined by equation (1) set forth below affects the permeating rate of nitrogen into a workpiece. The inventor found that the value of γ defined by equation (2) set forth below is an important factor that affects the permeating behavior of nitrogen into a workpiece.

$$a_c = \frac{(P_{CO})^2}{K \times (P_{CO_2})} \quad (1)$$

$$\gamma = \frac{a_c}{C_N} \quad (2)$$

Namely, the nitrogen permeating rate into a workpiece becomes higher as $a_C$ is smaller when γ is constant. Moreover, the nitrogen permeating rate into a workpiece becomes higher as γ is smaller when $a_C$ is constant. With regards to a workpiece formed of steel containing at least 0.8 mass % of carbon, the permeating rate of nitrogen into a workpiece becomes highest when the value of γ is 5, and the nitrogen permeating rate becomes constant when the value of γ is equal to or less than 5. By setting the value of γ to not more than 5, the permeating rate of nitrogen into a workpiece formed of steel containing at least 0.8 mass % of carbon can be rendered highest. As used herein, $a_C$ is the calculatory carbon activity in steel calculated by equation (1), $P_{CO}$ is the partial pressure of carbon monoxide (CO), $P_{CO_2}$ is the partial pressure of carbon dioxide ($CO_2$), K is the equilibrium constant at $<C> + CO_2 \Leftrightarrow 2CO$, and $C_N$ is the undecomposed ammonia concentration in the heat treatment furnace.

Although the permeating rate of nitrogen into a workpiece can be rendered maximum if the γ value of the atmosphere in the heat treatment furnace where carbonitriding is carried out is set to 5 or below, another problem will occur if the γ value is too small. If the γ value is to be set to below 2, the supply rate of ammonia (ammonia flow rate) to the heat treatment furnace must be increased. Accordingly, the partial pressure of carbon monoxide in the heat treatment furnace is reduced, so that the amount of enriched gas introduced into the heat treatment furnace must be increased in order to maintain the carbon potential. As a result, sooting readily occurs (soot is generated in the heat treatment furnace to adhere to the workpiece), leading to the possibility of inconvenience as to quality such as surface carburizing of the workpiece.

In the carbonitriding method according to an aspect of the present invention, the desired temperature history is applied to the workpiece in the heating pattern control step, and the γ value of the atmosphere in the heat treatment furnace is set to at least 2 and not more than 5 in the atmosphere control step. Therefore, the permeating rate of nitrogen into the workpiece can be set highest while suppressing generation of sooting. As a result, the permeating rate of nitrogen into a workpiece can be increased to improve the efficiency of the carbonitriding process.

The undecomposed ammonia concentration refers to the concentration of ammonia remaining in the gaseous ammonia state without being decomposed in the atmosphere of the heat treatment furnace with respect to the ammonia supplied to the heat treatment furnace.

Preferably in the carbonitriding method of the present aspect, the undecomposed ammonia concentration in the heat treatment furnace is measured, and the undecomposed ammonia concentration is compared with a target undecomposed ammonia concentration corresponding to the γ value in the range of at least 2 and not more than 5 to adjust the flow rate of ammonia supplied to the heat treatment furnace.

Accordingly, the undecomposed ammonia concentration of the atmosphere in the heat treatment furnace can be controlled with favorable accuracy. As a result, control of the γ value in the heat treatment furnace during the atmosphere control step set forth above is facilitated.

Preferably in the carbonitriding method according to the present aspect, the atmosphere control step is carried out such that the difference between the highest value and lowest value of the γ value is not more than 1 during a period where the workpiece is retained at the temperature of at least $A_1$ point.

As mentioned above, although the permeating rate of nitrogen will become constant if the γ value is 5 or below, a great variation in the γ value will cause the $a_C$ value to change greatly. In this case, the carbon potential ($C_P$) value will also change in accordance with the change in the $a_C$ value, as indicated in equation (3) set forth below. As used herein, $A_S$ is the physical property value depending upon the temperature. It would then become difficult to control the $C_P$ value to control the carbon concentration at the surface layer of the workpiece.

$$C_P = A_S \times a_C \quad (3)$$

To this context, control of the $C_P$ value is facilitated by setting the difference between the highest value and lowest value of the γ value to 1 or below during a period where the workpiece is retained at the temperature of at least $A_1$ point, i.e. the period during which carbonitriding of the workpiece is progressing.

When the $C_P$ value must be controlled more strictly in the carbonitriding process, the difference between the highest value and lowest value of the γ value is preferably set to not more than 0.6 during the period where the workpiece is retained at the temperature of at least $A_1$ point. Furthermore, a target γ value may be controlled by setting a target γ value of at least 2.3 and not more than 4.7 and control the γ value to be in the range of ±0.5 (preferably, within ±0.3) with respect to the target value.

The surface layer of a workpiece refers to the region in proximity to the surface of the workpiece, and refers to a region not more than 0.2 mm in distance from the surface when the workpiece is subjected to a finishing process and the like to be completed as a product. In other words, the surface layer of a workpiece is the region where the nitrogen concentration and carbon concentration should be controlled in the state where the workpiece is qualified as a completed product in consideration of the required property of the fabricated product of the workpiece subjected to processing, and can be determined appropriately for each product.

Preferably in the carbonitriding method according to the present aspect, the carbonitriding time that is the period of time during which the workpiece is retained at the temperature of at least $A_1$ point is determined, based on the relationship of the carbonitriding time and γ value to the nitrogen concentration at a region of a predetermined depth from the surface of the workpiece, determined for each steel composition constituting a workpiece.

The permeating rate of nitrogen into a workpiece during a carbonitriding process is a complex variable depending upon not only the carbonitriding time, but also the values of $C_N$, $a_c$, and the like during the carbonitriding process. It is therefore difficult to control the distribution of the nitrogen concentration in the workpiece. When the workpiece is subjected to a carbonitriding process, and then has the region in proximity to the surface removed by a finishing process or the like, the nitrogen content at a region of a predetermined depth, not at the region in proximity to the surface, will be crucial. According to the carbonitriding method of the aspect of the present invention, the permeating rate of nitrogen to the workpiece is maintained constantly at the maximum level. Therefore, the relationship between the permeating rate of nitrogen into a workpiece having a predetermined composition and the carbonitriding time will become constant if the γ value is constant. By identifying in advance the relationship of the γ value and carbonitriding time to the nitrogen concentration at a region of a predetermined depth from the surface of the workpiece that is determined for each steel composition constituting the workpiece, determination of the carbonitriding time based on the relevant relationship will allow control of the nitrogen content at the region of a predetermined depth of the workpiece.

A fabrication method of a machinery component according to an aspect of the present invention includes a steel member preparation step of preparing a steel member formed of steel containing at least 0.8 mass % of carbon and shaped roughly into a configuration of a machinery component, and a quench-hardening step of quench-hardening the steel member by cooling from the temperature of at least $A_1$ point to a temperature of not more than $M_S$ point, after the steel member prepared in the steel member preparation step is subjected to a carbonitriding process. The carbonitriding process in the quench-hardening step is carried out employing the carbonitriding method according to an aspect of the present invention set forth above.

As used herein, $A_1$ point refers to the temperature point where the steel structure transforms from ferrite into austenite. $M_S$ point refers to the temperature point where martensite is initiated during cooling of the austenitized steel.

By employing the carbonitriding method of the present invention set forth above in the quench-hardening step suitable for a workpiece formed of steel containing at least 0.8 mass % of carbon according to the fabrication method of a machinery component of the present aspect, an effective carbonitriding process is carried out, allowing the fabrication cost of the machinery component to be reduced.

A machinery component according to an aspect of the present invention is fabricated by the machinery component fabrication method of an aspect of the present invention set forth above. By fabricating a machinery component by the machinery component fabrication method according to an aspect of the present invention set forth above, the machinery component of the present aspect is subjected to an effective carbonitriding process to reduce the fabrication cost.

The machinery component of the present aspect may be used as a component constituting a bearing. A machinery component according to an aspect of the present invention having the surface layer increased in strength by being subjected to carbonitriding and reduced in fabrication cost is suitable for use as a component constituting a bearing that is a machinery component where fatigue strength, wear resistance, and the like are required.

Using a machinery component according to an aspect of the present invention set forth above, a rolling bearing including a bearing ring and a rolling element in contact with the bearing ring and disposed on a circular ring raceway, may be formed. Namely, at least one of the bearing ring and rolling element is a machinery component according to an aspect of the present invention set forth above. By such a machinery component according to an aspect of the present invention, having the surface layer increased in strength by being subjected to carbonitriding and reduced in fabrication cost, a rolling bearing of long lifetime, reduced in fabrication cost, can be provided.

The carbonitriding processing method based on the parameter of undecomposed ammonia concentration disclosed in the aforementioned Non-Patent Document 1 and Patent Document 1 is disadvantageous in that the quality of the workpiece cannot be stabilized in the case where a defective structure is generated such as an overcarburizing structure of excessive carbon permeating into the surface layer of the workpiece, a decarburizing structure with reduced carbon content, loss of depositions (carbides, carbonitrides, and the like) when the supplied amount of ammonia to the heat treatment furnace varies during the carbonitriding process. The inventor found a way to overcome such problems by virtue of a carbonitriding method, a fabrication method of a machinery component utilizing such a carbonitriding method, and a machinery component thereby according to another aspect of the present invention set forth below.

A carbonitriding method according to another aspect of the present invention includes an atmosphere control step of controlling the atmosphere in a heat treatment furnace, and a heating pattern control step of controlling a temperature history applied to a workpiece in the heat treatment furnace. The atmosphere control step includes an undecomposed ammonia concentration control step of controlling the undecomposed ammonia concentration in the heat treatment furnace by adjusting the supplied amount of ammonia to the heat treatment furnace, and a partial pressure control step of controlling the partial pressure of at least one of the carbon monoxide and carbon dioxide in the heat treatment furnace. In the partial pressure control step, when the amount of supplied ammonia is modified in the undecomposed ammonia concentration control step and the partial pressure ratio that is the ratio of the partial pressure of carbon monoxide to the partial pressure of carbon dioxide changes, the partial pressure of at least one of carbon monoxide and carbon dioxide is modified so as to cancel the change of the partial pressure ratio prior to modification of the supplied amount of ammonia to the partial pressure ratio after the supplied amount of ammonia is modified.

The inventor studied in detail the relationship between the controlled state of the atmosphere in the heat treatment furnace and generation of a defective structure at the surface layer of the workpiece. The inventor found that, in the case where the supplied amount of ammonia (flow rate) into the heat treatment furnace is modified, the partial pressure ratio of carbon monoxide to carbon dioxide that affects the carburizing behavior correspondingly changes, and the permeating behavior of carbon into the surface layer of a workpiece cannot be controlled as aimed, causing generation of a defective structure unless the atmosphere is controlled taking into account such events sufficiently. The inventor found that the generation of a defective structure can be suppressed by modifying the partial pressure of at least one of carbon monoxide and carbon dioxide so as to directly cancel the change in the partial pressure ratio of carbon monoxide to carbon dioxide when the supplied amount of ammonia is modified in the carbonitriding process, arriving at the present invention.

According to the carbonitriding method of another aspect of the present invention, the supplied amount of ammonia is adjusted based on the parameter of the undecomposed ammonia concentration in the heat treatment furnace to adjust the amount of nitrogen permeating into the workpiece. By adjusting the supplied amount of ammonia, if the supplied amount of ammonia is altered, which causes change in the partial pressure ratio of carbon monoxide to carbon dioxide, the partial pressure ratio can be promptly restored to the state prior to change. As a result, the carbon potential ($C_P$) value in the heat treatment furnace, the activity ($a_C$) of carbon in the workpiece and the like, based on the parameter of the partial pressure ratio and that directly affects the carburizing behavior of the workpiece (refer to equations (1) and (3)), can be controlled with favorable accuracy. Thus, generation of a defective structure can be suppressed to allow the quality of the workpiece to be stabilized.

Preferably in the carbonitriding method according to another aspect of the present invention set forth above, the undecomposed ammonia concentration in the heat treatment furnace is measured, and the nitrogen concentration at the surface layer of the workpiece is controlled by adjusting the flow rate of ammonia supplied into the heat treatment furnace based on the relationship between the undecomposed ammonia concentration and the nitrogen concentration at the surface layer of the workpiece, in the undecomposed ammonia control step.

Accordingly, the undecomposed ammonia concentration of the atmosphere in the heat treatment furnace can be controlled with favorable accuracy, allowing control of the amount of nitrogen permeating into the workpiece at high accuracy.

Preferably in the carbonitriding method according to another aspect of the present invention set forth above, modification of the supplied amount of ammonia in the undecomposed ammonia concentration control step is executed after the volume of carburization gas at 20° C. and 1.05 atmospheric pressure, supplied to the heat treatment furnace subsequent to the previous modification of the supplied amount of ammonia executed immediately preceding the modification of the supplied amount of ammonia, becomes equal to or larger than the capacity of the heat treatment furnace.

The inventor diligently studied for measures to suppress the effect of change in the supplied amount of ammonia on the accuracy of controlling the partial pressure ratio of carbon monoxide and carbon dioxide. The inventor found that, when there is a change in the supplied amount of ammonia of a level generally required for control of undecomposed ammonia concentration, carburization gas supply of an amount larger than the capacity of the heat treatment furnace at 20° C. and 1.05 atmospheric pressure is required to restore the partial pressure ratio of carbon monoxide to carbon dioxide that was correspondingly changed to the state prior to change in the ammonia supplied amount.

By modifying the ammonia supplied amount upon confirming that the aforementioned condition is satisfied, modification to a new supplied amount of ammonia is executed after the partial pressure ratio is restored to the previous state before modification of the supplied amount of ammonia. As a result, control of $C_P$, $a_C$, and the like will be further facilitated in the carbonitriding method according to another aspect of the present invention, allowing further suppression of the generation of a defective structure.

For the carburization gas employed in the carbonitriding method of the present invention, mixture gas of RX gas and enriched gas, for example, can be employed. Controlling the partial pressure ratio of carbon monoxide to carbon dioxide set forth above can be effected by adjusting the supplied amount (flow rate) of propane ($C_3H_8$) gas, butane gas ($C_4H_{10}$) and the like, serving as enriched gas.

A fabrication method of a machinery component according to another aspect of the present invention includes a steel member preparation step of preparing a steel member shaped roughly in a configuration of a machinery component, and a quench-hardening step of quench-hardening the steel member by cooling from the temperature of at least $A_1$ point down to a temperature of not more than $M_S$ point, after the steel member prepared in the steel member preparation step is subjected to a carbonitriding process. The carbonitriding process in the quench-hardening step is carried out employing the carbonitriding method according to another aspect of the present invention set forth above.

According to the fabrication method of a machinery component of another aspect of the present invention, fabrication of a machinery component having stable quality can be fabricated by employing the carbonitriding method according to another aspect of the present invention set forth above that allows a stable carbonitriding process in the quench-hardening step.

The machinery component of the present aspect may be used as a component constituting a bearing. A machinery component according to another aspect of the present invention having the surface layer increased in strength by being subjected to carbonitriding and stabilized in quality is suitable for use as a component constituting a bearing that is a machinery component where fatigue strength, wear resistance, and the like are required.

Using a machinery component according to another aspect of the present invention set forth above, a rolling bearing including a bearing ring and a rolling element in contact with the bearing ring and disposed on a circular ring raceway may be formed. Namely, at least one of the bearing ring and rolling element is a machinery component according to another aspect of the present invention set forth above. By such a machinery component according to another aspect of the present invention, having the surface layer increased in strength by being subjected to carbonitriding and stabilized in quality, a rolling bearing of long lifetime and stabilized in quality can be provided.

The carbonitriding method, the fabrication method of a machinery component, and the machinery component according to one aspect and another aspect of the present invention set forth above can be implemented independently, or in combination.

Effects of the Invention

As apparent from the description set forth above, by the carbonitriding method according to an aspect of the present invention, there can be provided a carbonitriding method directed to increasing the permeating rate of nitrogen to improve the efficiency of the carbonitriding process. Furthermore, by carrying out an effective carbonitriding process according to a machinery component fabrication method of an aspect of the present invention, there can be provided a fabrication method of a machinery component, allowing the fabrication cost to be reduced. In addition, by carrying out an effective carbonitriding process, a machinery component according to an aspect of the present invention, reduced in fabrication cost, can be provided.

Figure 1:
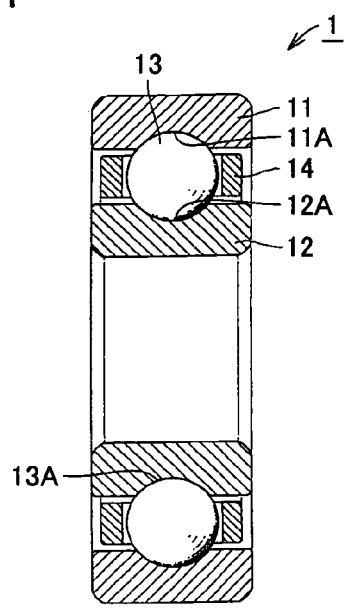
FIG. 1 is a schematic sectional view of a configuration of a deep groove ball bearing qualified as a rolling bearing including a machinery component according to a first embodiment and a second embodiment.

DESCRIPTION OF THE REFERENCE CHARACTERS 1 deep groove ball bearing; 2 thrust needle roller bearing; 3 constant velocity joint; 11 outer ring; 11A outer ring raceway; 12 inner ring; 12A inner ring raceway; 13 ball; 14 cage; 21 bearing ring; 21A bearing ring raceway; 23 needle roller; 24 cage; 31 inner race; 31A inner race ball groove; 32 outer race; 32A outer race ball groove; 33 ball; 34 cage; 35, 36 shaft.

BEST MODES FOR CARRYING OUT THE INVENTION

Embodiments of the present invention will be described hereinafter based on drawings. In the drawings, the same or corresponding elements have the same reference characters allotted, and description thereof will not be repeated.

First Embodiment

A deep groove ball bearing qualified as a rolling bearing according to a first embodiment that is one embodiment of an aspect of the present invention will be described hereinafter with reference to FIG. 1.

Referring to FIG. 1, a deep groove ball bearing 1 according to the first embodiment includes an annular outer ring 11, an annular inner ring 12 arranged at the inner side of outer ring 11, and a plurality of balls 13 serving as rolling elements arranged between outer and inner rings 11 and 12, held in a cage 14 of a circular ring configuration. An outer ring raceway 11A is formed at the inner circumferential face of outer ring 11. An inner ring raceway 12A is formed at the outer circumferential face of inner ring 12. Outer ring 11 and inner ring 12 are disposed such that inner ring raceway 12A and outer ring raceway 11A face each other. The plurality of balls 13 are held in a rollable manner on the circular raceway, in contact with the inner ring raceway 12A and outer ring raceway 11A, disposed at a predetermined pitch in the circumferential direction by means of cage 14. By such a configuration, outer ring 11 and inner ring 12 of deep groove ball bearing 11 can be rotated relative to each other.

Among outer ring 11, inner ring 12, ball 13 and cage 14 that are machinery components, particularly outer ring 11, inner ring 12 and ball 13 require rolling fatigue strength and wear resistance. By employing at least one thereof as a machinery component according to an aspect of the present invention, the lifetime of deep groove ball bearing 1 can be increased while reducing the fabrication cost thereof.

A thrust needle roller bearing qualified as a rolling bearing according to a first modification of the first embodiment will be described hereinafter with reference to FIG. 2.

Figure 2:
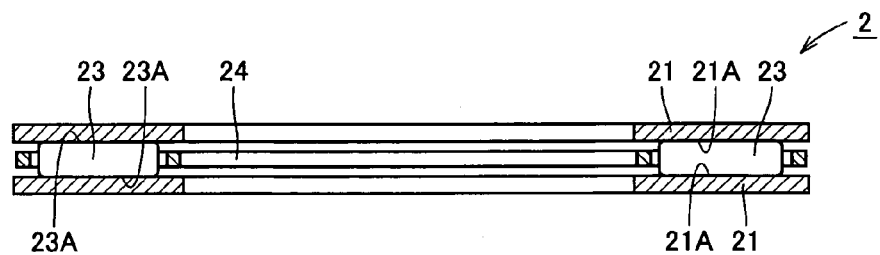
FIG. 2 is a schematic sectional view of a configuration of a thrust needle roller bearing qualified as a rolling bearing including a machinery component according to a first modification of the first and second embodiments.

Referring to FIG. 2, a thrust needle roller bearing 2 according to the first modification of the first embodiment includes a pair of bearing rings 21 taking a disk shape, serving as a rolling member arranged such that one main surface faces each other, a plurality of needle rollers 23 serving as a rolling member, and a cage 24 of a circular ring configuration. The plurality of needle rollers 23 are held in a rollable manner on the circular raceway, in contact with bearing ring raceway 21A formed at the main surfaces of the pair of bearing rings 21 facing each other, disposed at a predetermined pitch in the circumferential direction by means of cage 24. By such a configuration, the pair of bearing rings 21 of thrust needle roller bearing 2 can be rotated relative to each other.

Among bearing ring 21, needle roller 23, and cage 24 that are machinery components, particularly bearing ring 21 and needle roller 23 require rolling fatigue strength and wear resistance. By employing at least one thereof as a machinery component according to an aspect of the present invention, the lifetime of thrust needle roller bearing 2 can be increased while reducing the fabrication cost thereof.

Figure 3:
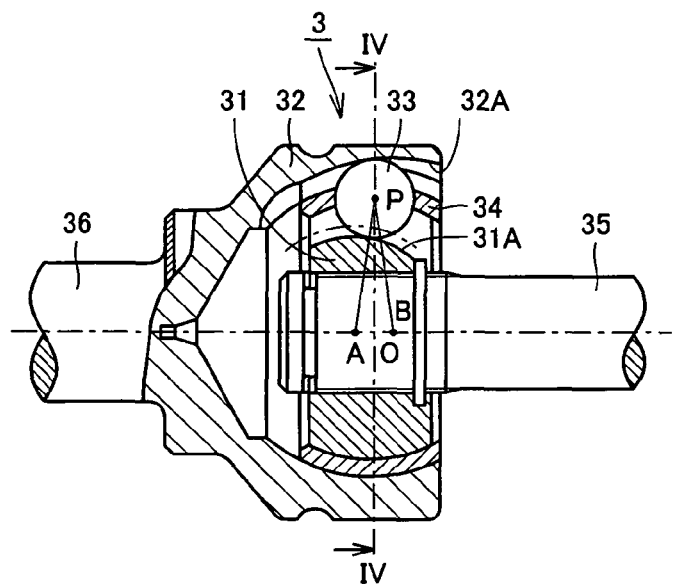
FIG. 3 is a schematic partial sectional view of a configuration of a constant velocity joint including a machinery component according to a second modification of the first and second embodiments.

A constant velocity joint according to a second modification of the first embodiment will be described hereinafter with reference to FIGS. 3-5. FIG. 3 is a schematic sectional view taken along line III-III of FIG. 4.

Figure 4:
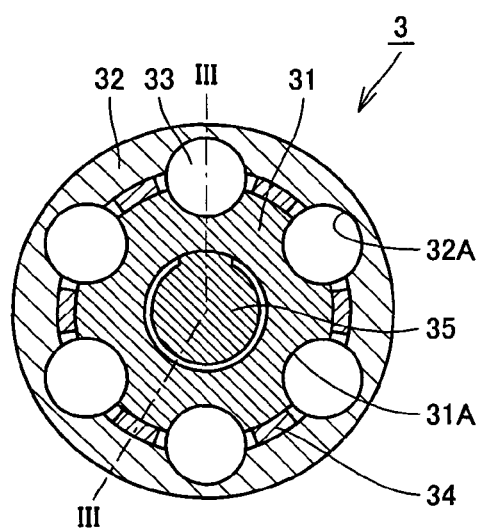
FIG. 4 is a schematic sectional view taken along line IV-IV of FIG. 3.
Figure 5:
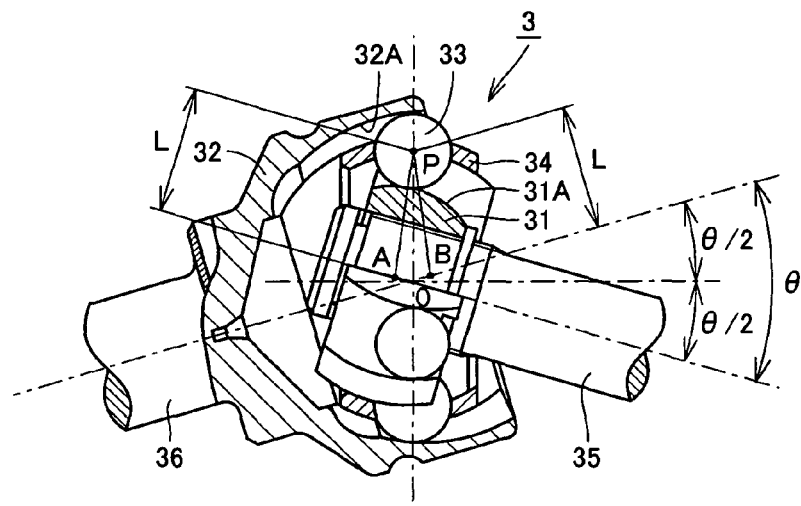
FIG. 5 is a schematic partial sectional view of the constant velocity joint of FIG. 3 in an angled state.

Referring to FIGS. 3-5, a constant velocity joint 3 according to the second modification of the first embodiment includes an inner race 31 coupled to a shaft 35, an outer race 32 arranged to surround the outer circumferential side of inner race 31 and coupled to shaft 36, a ball 33 for torque transmission, arranged between inner race 31 and outer race 32, and a cage 34 for holding ball 33. Ball 33 is arranged in contact with an inner race ball groove 31A formed at the outer circumferential face of inner race 31 and an outer race ball groove 32A formed at the inner circumferential face of outer race 32, and held by cage 34 to avoid falling off.

As shown in FIG. 3, inner race ball groove 31A and outer race ball groove 32A located at the outer circumferential face of inner race 31 and the inner circumferential face of outer race 32, respectively, are formed in a curve (arc) with points A and B equally spaced apart at the left and right on the axis passing through the center of shafts 35 and 36 in a straight line from the joint center O on the axis as the center of curvature. In other words, inner race ball groove 31A and outer race ball groove 32A are formed such that the trajectory of center P of ball 33 that rolls in contact with inner race ball groove 31A and outer race ball groove 32A corresponds to a curve (arc) with point A (inner race center A) and point B (outer race center B) as the center of curvature. Accordingly, ball 33 is constantly located on the bisector of an angle (∠AOB) with respect to the axis passing through the center of shafts 35 and 36 even when the constant velocity joint is operated at an angle (when the constant-velocity joint moves such that the axes passing through the center of shafts 35 and 36 cross).

The operation of constant velocity joint 3 will be described hereinafter. Referring to FIGS. 3 and 4, when the rotation about the axis is transmitted to one of shafts 35 and 36 at constant velocity joint 3, this rotation is transmitted to the other of shafts 35 and 36 via ball 33 placed in inner race ball groove 31A and outer race ball groove 32A. In the case where shafts 35 and 36 constitute an angle of θ as shown in FIG. 5, ball 33 is guided by inner race ball groove 31A and outer race ball groove 32A with inner race center A and outer race center B as the center of curvature to be held at a position where its center P is located on the bisector of ∠AOB. Since inner race ball groove 31A and outer race ball groove 32A are formed such that the distance from joint center O to inner race center A is equal to the distance from joint center O to outer race center B, the distance from center P of ball 33 to respective inner race center A and outer race center B is equal. Thus, ΔOAP is congruent to ΔOBP. As a result, the distance L from center P of ball 33 to shafts 35 and 36 are equal to each other. When one of shafts 35 and 36 rotates about the axis, the other also rotates at constant velocity. Thus, constant velocity joint 3 can ensure constant velocity in the state where shafts 35 and 36 constitute an angle. Cage 34 serves, together with inner race ball groove 31A and outer race ball groove 32A, to prevent ball 33 from jumping out of inner race ball groove 31A and outer race ball groove 32A when shafts 35 and 36 rotate, and also to determine joint center O of constant velocity joint 3.

Among inner race 31, outer race 32, ball 33 and cage 34 that are machinery components, particularly inner race 31, outer race 32 and ball 33 require fatigue strength and wear resistance. By taking at least one thereof as the machinery component according to an aspect of the present invention, the lifetime of constant velocity joint 3 can be increased with the fabrication cost reduced.

Figure 6:
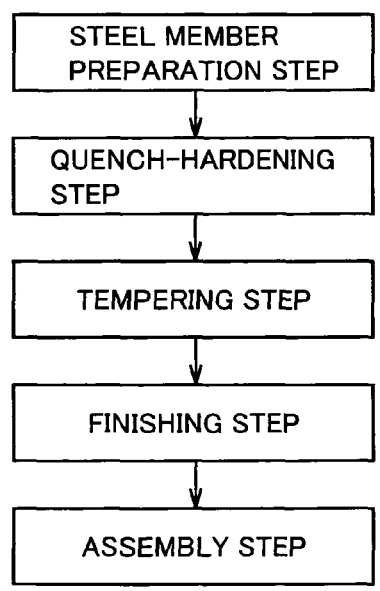
FIG. 6 schematically represents a machinery component of the first and second embodiments, and a fabrication method of a machinery element including such machinery component.

The foregoing machinery component of the first embodiment corresponding to one embodiment in the fabrication method of a machinery component according to one aspect of the present invention, and a fabrication method of a machinery element such as a rolling bearing and constant velocity joint including such a machinery component will be described hereinafter. Referring to FIG. 6, first a steel member preparation step of preparing a steel member formed of steel containing at least 0.8 mass % of carbon, shaped roughly in a configuration of a machinery component, is carried out. Specifically, a steel bar containing at least 0.8 mass % of carbon, for example, is used as the material. This steel bar is subjected to processing such as cutting, forging, turning and the like to be prepared as a steel member shaped roughly into the configuration of a machinery component such as outer ring 11, bearing ring 21, inner race 31, or the like.

The steel member prepared at the steel member preparation step is subjected to a carbonitriding process, and then cooled down to a temperature equal to or less than $M_S$ point from the temperature of at least $A_1$ point. This corresponds to the quenching-hardening step of quench-hardening the steel member. Details of the quench-hardening step will be described afterwards.

Then, the steel member subjected to the quench-hardening step is heated to a temperature of not more than $A_1$ point. This tempering step is carried out to improve the toughness and the like of the steel member that has been quench-hardened. Specifically, the quench-hardened steel member is heated to a temperature of at least 150° C. and not more than 350° C., for example 180° C., that is a temperature lower than $A_1$ point, and maintained for a period of time of at least 30 minutes and not more than 240 minutes, for example 120 minutes, followed by being cooled in the air of room temperature (air cooling).

Further, a finishing step such as machining is applied on the steel member subjected to the tempering step. Specifically, a grinding process is applied on inner ring raceway 12A, bearing ring raceway 21A, outer race ball groove 32A and the like identified as a steel member subjected to the tempering step. Thus, a machinery component according to the first embodiment of the present invention is completed, and the fabrication method of a machinery component according to the first embodiment of the present invention ends. In addition, an assembly step of fitting the completed machinery component to build a machinery element is implemented. Specifically, outer ring 11, inner ring 12, ball 13 and cage 14, for example, that are machinery components according to an aspect of the present invention fabricated by the steps set forth above are fitted together to build a deep groove ball bearing 1. Thus, a machinery element including a machinery component according to an aspect of the present invention is fabricated.

The details of a quench-hardening step in the fabrication method of a machinery component of the first embodiment will be described with reference to FIGS. 7 and 8. In FIG. 8, the horizontal direction corresponds to time with the elapse in the rightward direction, whereas the vertical direction corresponds to temperature, representing a higher temperature as a function of height.

Figure 7:
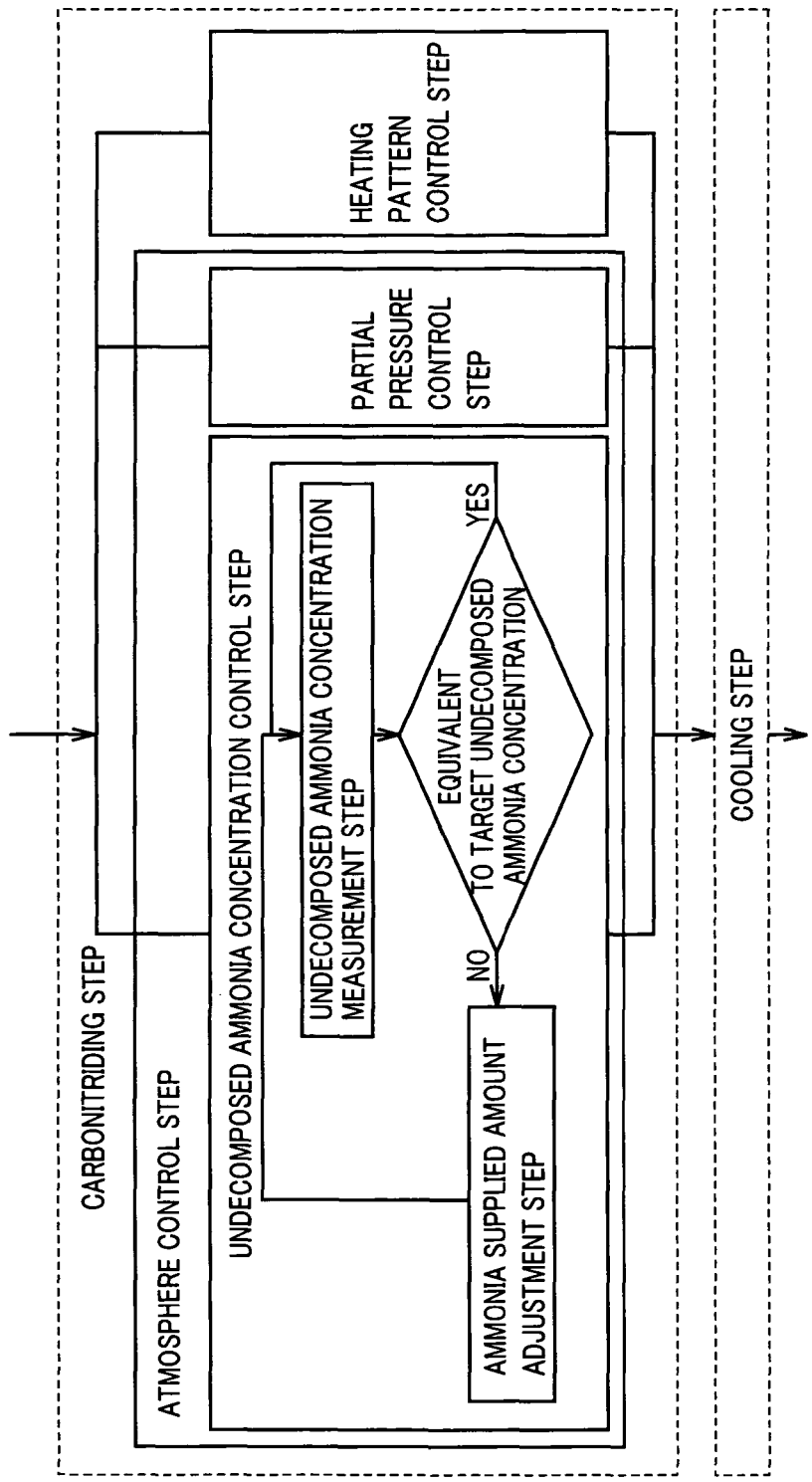
FIG. 7 is a diagram to describe in detail a quench-hardening step in the fabrication method of a machinery component according to the first and second embodiments.
Figure 8:
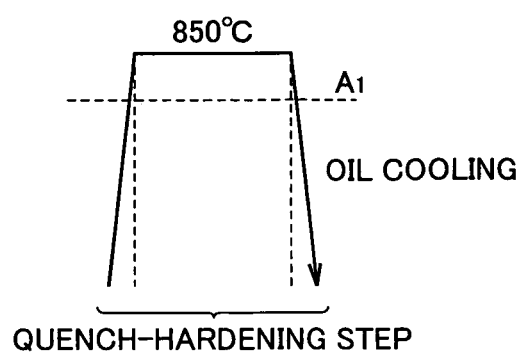
FIG. 8 represents an example of a heating pattern (temperature history applied to workpiece) in a heating pattern control step included in the carbonitriding step of FIG. 7.

Referring to FIG. 7, in the quench-hardening step of the fabrication method of a machinery component according to the first embodiment of the present invention, the carbonitriding method of the first embodiment is employed to implement a carbonitriding step. In the carbonitriding method according to the first embodiment of the present invention, a carbonitriding step of carbonitriding a steel member identified as a workpiece is first carried out. Then, a cooling step of cooling the steel member from the temperature of at least $A_1$ point down to the temperature of not more than $M_S$ point is carried out.

The carbonitriding step includes an atmosphere control step of controlling the atmosphere in the heat treatment furnace, and a heating pattern control step of controlling the temperature history applied to the workpiece in the heat treatment furnace. The atmosphere control step and heating pattern control step can be carried out concurrently, independent of each other. The atmosphere control step includes an undecomposed ammonia concentration control step of controlling the undecomposed ammonia concentration in the heat treatment furnace, and a partial pressure control step of controlling the partial pressure of at least one of carbon monoxide and carbon dioxide in the heat treatment furnace.

In the partial pressure control step, by controlling the partial pressure of at least one of carbon monoxide and carbon dioxide in the heat treatment furnace with reference to equations (1)-(3), the $a_C$ value is controlled to adjust the $\gamma$ value as well as the $C_P$ value. In the atmosphere control step, the undecomposed ammonia concentration control step and partial pressure control step are carried out such that the $\gamma$ value is in the range of at least 2 and not more than 5.

Specifically, at the undecomposed ammonia concentration control step, an undecomposed ammonia concentration measurement step of measuring the undecomposed ammonia concentration in the heat treatment furnace is carried out. The undecomposed ammonia concentration can be measured by using, for example, a gas chromatograph. Then, an undecomposed ammonia concentration determination step of determining whether an ammonia supplied amount adjustment step of increasing or decreasing the supplied amount of ammonia gas to the heat treatment furnace is to be executed or not based on the undecomposed ammonia concentration measured at the undecomposed ammonia concentration measurement step is carried out. The determination is based on the comparison between a target undecomposed ammonia concentration determined in advance so as to achieve a $\gamma$ value in the range of at least 2 and not more than 5, and the measured undecomposed ammonia concentration.

When the undecomposed ammonia concentration is not equal to the target undecomposed ammonia concentration, an ammonia supplied amount adjustment step of increasing or reducing the undecomposed ammonia concentration in the heat treatment furnace is carried out. Then, the undecomposed ammonia concentration measurement step is carried out again. The ammonia supplied amount adjustment step can be carried out by adjusting the amount of ammonia flowing into the heat treatment furnace per unit time (flow rate of ammonia gas) from an ammonia gas cylinder coupled to the heat treatment furnace via a pipe using a flow rate control device including a mass flow controller attached to the pipe. Specifically, when the measured undecomposed ammonia concentration is higher than the target undecomposed ammonia concentration, the flow rate is reduced. When the measured undecomposed ammonia concentration is lower than the target undecomposed ammonia concentration, the flow rate is increased. Thus, the ammonia supplied amount adjustment step can be carried out. When there is a predetermined difference between the measured undecomposed ammonia concentration and the target undecomposed ammonia concentration in the ammonia supplied amount adjustment step, how much the flow rate is to be increased/decreased can be determined based on the relationship between the increase/decrease of the flow rate of ammonia gas and the increase/decrease of undecomposed ammonia concentration, determined empirically in advance.

In the case where the undecomposed ammonia concentration is equal to the target undecomposed ammonia concentration, an undecomposed ammonia concentration measurement step is carried out again without execution of the ammonia supplied amount adjustment step.

In the partial pressure control step, the partial pressure of at least one of CO and $CO_2$ is controlled by adjusting the supplied amount of propane ($C_3H_8$) gas, butane gas ($C_4H_{10}$) and the like, serving as enriched gas to adjust the $a_C$ value. Specifically, the carbon monoxide partial pressure $P_{CO}$ and the carbon dioxide partial pressure $P_{CO2}$ in the atmosphere are measured using an infrared gas concentration measurement apparatus. The supplied amount of propane ($C_3H_8$) gas, butane gas ($C_4H_{10}$) and the like serving as enriched gas is adjusted such that the $a_C$ value is equal to the target value based on the measured value.

The $\gamma$ value may be controlled by altering the $a_C$ value through the partial pressure control step with the undecomposed ammonia concentration maintained at a constant level by the undecomposed ammonia concentration control step. Conversely, the $\gamma$ value may be controlled by altering the undecomposed ammonia concentration through the undecomposed ammonia concentration control step with the $a_C$ value maintained constant through the partial pressure control step. In addition, the undecomposed ammonia concentration and $a_C$ value may be altered by the undecomposed ammonia concentration control step and partial pressure control step to adjust the $\gamma$ value.

In the case where the $\gamma$ value is in the vicinity of 5, the atmosphere must be controlled strictly in order to ensure that the permeating rate of nitrogen into the workpiece is maintained at the highest state. In order to facilitate atmosphere control, the $\gamma$ value is preferably not more than 4.7. From the standpoint of the nitrogen permeating rate, the $\gamma$ value may be set as low as 2. However, this induces the necessity of increasing the flow rate of ammonia gas introduced into the heat treatment furnace. In view of the relatively high cost of ammonia gas, it is preferable to set the $\gamma$ value to at least 2.5 in order to reduce the cost in carbonitriding.

In the heating pattern control step, the heating history applied to the steel member qualified as a workpiece is controlled. Specifically, as shown in FIG. 8, the steel member is heated to a temperature of at least 800° C. and not more than 1000° C. that is a temperature of at least $A_1$ point, for example to 850° C., and maintained for a period of at least 60 minutes and not more than 300 minutes, for example 150 minutes, in the atmosphere controlled by the atmospheric control step and partial pressure control step set forth above. At the elapse of the maintaining period, the heating pattern control step ends. The atmospheric control step also ends at the same time.

Then, the steel member is immersed in oil (oil cooling) to be cooled from a temperature of at least $A_1$ point down to a temperature of not more than $M_S$ point. This corresponds to the cooling step. By the steps set forth above, the steel member has the surface layer subjected to carbonitriding as well as quench-hardening. Thus, the quench-hardening step of the first embodiment is completed.

According to the carbonitriding method of the first embodiment having the $\gamma$ value controlled in the range of at least 2 and not more than 5 with respect to a workpiece formed of steel containing at least 0.8 mass % of carbon, the permeating rate of nitrogen into the workpiece can be maximized while suppressing generation of sooting. As a result, the permeating rate of nitrogen into the workpiece is increased to improve the efficiency of the carbonitriding process.

In addition, according to the carbonitriding method of first embodiment, determination is made whether adjustment of the ammonia supplied amount is required or not based on the measured value of the undecomposed ammonia concentration in the heat treatment furnace to control the undecomposed ammonia concentration to be equal to the target concentration. Accordingly, the undecomposed ammonia concentration of the atmosphere in the heat treatment furnace can be controlled with favorable accuracy. As a result, control of the γ value in the heat treatment furnace at the atmosphere control step is facilitated.

According to the fabrication method of a machinery component of the first embodiment, a machinery component subjected to a carbonitriding process can be fabricated with the fabrication cost reduced. The machinery component of the first embodiment is identified as a machinery component subjected to a carbonitriding process with the fabrication cost reduced.

In the carbonitriding method according to one aspect of the present invention, the carbonitriding time is preferably determined based on the relationship of the γ value and the carbonitriding time to the nitrogen concentration at the region of a predetermined depth from the surface of the workpiece, determined for each steel composition constituting the steel member identified as a workpiece. Specifically, a test piece formed of steel of a certain composition is actually subjected to carbonitriding for various carbonitriding periods of time in a heat treatment furnace under a predetermined γ value to determine the relationship between the carbonitriding time and nitrogen concentration at respective regions of different depth. At this stage, the difference between the heat treatment pattern, particularly the ratio of the rising temperature and falling temperature at a temperature region of at least $A_1$ point to time (rate of temperature increase and rate of temperature decrease), and the rate of temperature increase and the rate of temperature decrease of the steel member actually subjected to heat treatment, is preferably not more than 50%. The nitrogen concentration at a region of different depth can be measured by, for example, EPMA (Electron Probe Micro Analysis). In the carbonitriding procedure of a steel member qualified as a workpiece, the depth at which the nitrogen concentration is to be controlled is determined in consideration of the machining step applied after the workpiece is subjected to carbonitriding as well as the subsequent usage state, and then the carbonitriding time is determined such that the nitrogen concentration at the depth where the nitrogen concentration is to be controlled attains the desired concentration based on the relationship set forth above.

The relationship of the γ value and carbonitriding time to the nitrogen concentration at the region of a predetermined depth from the surface of the workpiece is determined depending upon the composition of the steel constituting the workpiece. By determining in advance such a relationship, the carbonitriding time can be defined based on the determined relationship for a workpiece of the same composition even if the shape of the workpiece is modified. Accordingly, the nitrogen content at the region of a predetermined depth that is important for the workpiece can be readily controlled.

Second Embodiment

A deep groove ball bearing qualified as a rolling bearing according to a second embodiment that is one embodiment of another aspect of the present invention will be described hereinafter with reference to FIG. 1.

Referring to FIG. 1, a deep groove ball bearing 1 of the second embodiment basically has a configuration similar to that of deep groove ball bearing 1 of the first embodiment set forth above, and operates in a similar manner.

Among outer ring 11, inter ring 12, ball 13 and cage 14 that are machinery components, particularly outer ring 11, inner ring 12 and ball 13 require rolling fatigue strength and wear resistance. By taking at least one thereof as a machinery component according to another aspect of the present invention, deep groove ball bearing 1 is stabilized in quality and increased in lifetime.

A thrust needle roller bearing qualified as a rolling bearing according to a first modification of the second embodiment as one embodiment according to another aspect of the present invention will be described hereinafter with reference to FIG. 2.

Referring to FIG. 2, a thrust needle roller bearing 2 of the first modification of the second embodiment has a configuration basically similar to that of thrust needle roller bearing 2 of the first modification of the first embodiment set forth above, and operates in a similar manner.

Among bearing ring 21, needle roller 23 and cage 24 that are machinery components, particularly bearing ring 21 and needle roller 23 require rolling fatigue strength and wear resistance. Therefore, by taking at least one thereof as a machinery component according to another aspect of the present invention, thrust needle roller bearing 2 can be stabilized in quality and increased in lifetime.

A constant velocity joint according to a second modification of the second embodiment that is one embodiment according to another aspect of the present invention will be described hereinafter with reference to FIGS. 3-5.

Referring to FIGS. 3-5, a constant velocity joint 3 of the second modification of the second embodiment has a structure similar to that of constant velocity joint 3 of the second modification of the first embodiment set forth above, and operates in a similar manner.

Among inner race 31, outer race 32, ball 33 and cage 34 that are machinery components, particularly inner race 31, outer race 32 and ball 33 require fatigue strength and wear resistance. Therefore, by taking at least one thereof as a machinery component according to another aspect of the present invention, constant velocity joint 3 can be stabilized in quality and increased in lifetime.

The foregoing machinery component of the second embodiment corresponding to one embodiment in the fabrication method of a machinery component according to another aspect of the present invention, and a fabrication method of a machinery element such as a rolling bearing and constant velocity joint including such a machinery component will be described hereinafter. Referring to FIG. 6, first a steel member preparation step of preparing a steel member, shaped roughly in a configuration of a machinery component, is carried out. Specifically, a steel bar is used as the material. This steel bar is subjected to processing such as cutting, forging, turning and the like to be prepared as a steel member shaped roughly into the configuration of a machinery component such as outer ring 11, bearing ring 21, inner race 31, or the like.

The steel member prepared at the steel member preparation step is subjected to a carbonitriding process, and then cooled down to a temperature equal to or less than $M_S$ point from the temperature of at least $A_1$ point. This corresponds to the quenching-hardening step of quench-hardening the steel member. Details of the quench-hardening step will be described afterwards.

Then, the steel member subjected to the quench-hardening step is heated to a temperature of not more than $A_1$ point. This tempering step is carried out to improve the toughness and the like of the steel member that has been quench-hardened. Specifically, the quench-hardened steel member is heated to a temperature of at least 150° C. and not more than 350° C., for example 180° C., that is a temperature lower than $A_1$ point, and maintained for a period of time of at least 30 minutes and not more than 240 minutes, for example 120 minutes, followed by being cooled in the air of room temperature (air cooling).

Further, a finishing step such as machining is applied on the steel member subjected to the tempering step. Specifically, a grinding process is applied on inner ring raceway 12A, bearing ring raceway 21A, outer race ball groove 32A and the like identified as a steel member subjected to the tempering step. Thus, a machinery component according to the second embodiment of the present invention is completed, and the fabrication method of a machinery component according to the second embodiment of the present invention ends. In addition, an assembly step of fitting the completed machinery component to build a machinery element is implemented. Specifically, outer ring 11, inner ring 12, ball 13 and cage 14, for example, that are machinery components according to another aspect of the present invention fabricated by the steps set forth above are fitted together to build a deep groove ball bearing 1. Thus, a machinery element including a machinery component according to another aspect of the present invention is fabricated.

The details of a quench-hardening step in the fabrication method of a machinery component of the second embodiment will be described hereinafter with reference to FIGS. 7 and 8.

Referring to FIG. 7, in the quench-hardening step of the fabrication method of a machinery component according to the second embodiment of the present invention, the carbonitriding method of the second embodiment is employed to implement a carbonitriding step. In the carbonitriding method according to the second embodiment of the present invention, a carbonitriding step of carbonitriding a steel member identified as a workpiece is first carried out. Then, a cooling step of cooling the steel member from the temperature of at least $A_1$ point down to the temperature of not more than $M_S$ point is carried out.

The carbonitriding step includes an atmosphere control step of controlling the atmosphere in the heat treatment furnace, and a heating pattern control step of controlling the temperature history applied to the workpiece in the heat treatment furnace. The atmosphere control step and heating pattern control step can be carried out concurrently, independent of each other. The atmosphere control step includes an undecomposed ammonia concentration control step of controlling the undecomposed ammonia concentration in the heat treatment furnace, and a partial pressure control step of controlling the partial pressure of at least one of carbon monoxide and carbon dioxide in the heat treatment furnace.

Specifically, at the undecomposed ammonia concentration control step, an undecomposed ammonia concentration measurement step of measuring the undecomposed ammonia concentration in the heat treatment furnace is carried out. The undecomposed ammonia concentration can be measured by using, for example, a gas chromatograph. Then, an undecomposed ammonia concentration determination step of determining whether an ammonia supplied amount adjustment step of increasing or decreasing the supplied amount of ammonia gas to the heat treatment furnace is to be executed or not based on the undecomposed ammonia concentration measured at the undecomposed ammonia concentration measurement step is carried out. The determination is made based on the relationship between an undecomposed ammonia concentration and the nitrogen concentration at the surface layer of the workpiece, obtained empirically in advance.

An embodiment of the undecomposed ammonia concentration determination step according to the second embodiment will be described hereinafter with reference to FIG. 11.

Figure 11:
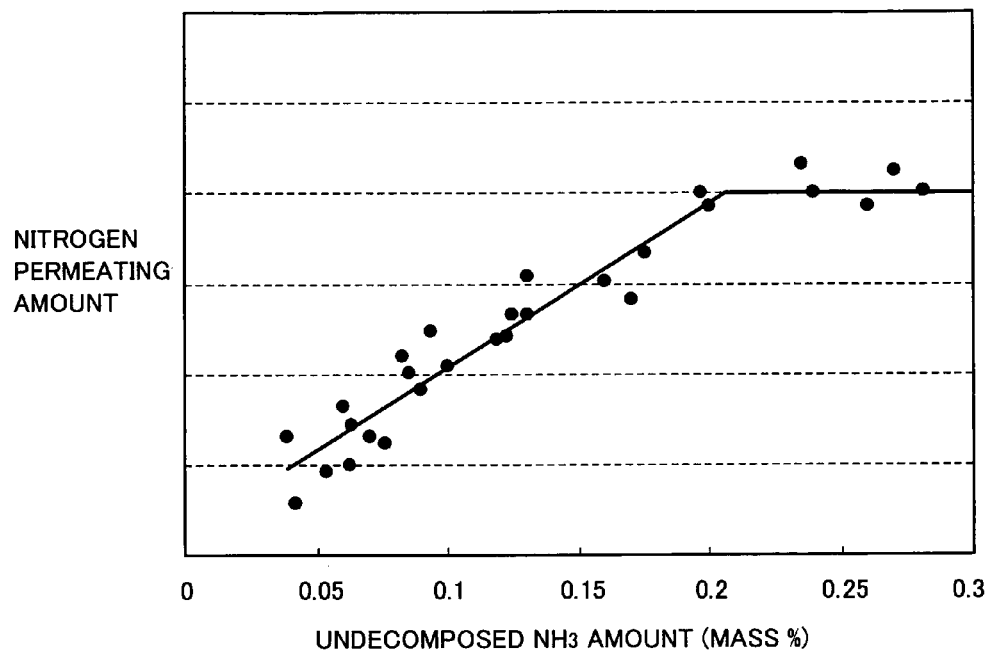
FIG. 11 represents the relationship between the amount of undecomposed ammonia in the heat treatment furnace and the permeating amount of nitrogen into the workpiece (the mass of nitrogen permeating into the workpiece from the unit surface area of the workpiece), when the carbonitriding process is carried out under the conditions of a carbonitriding processing time of 9000 seconds and an $a_C$ value of 1.0.

Referring to FIG. 11, when the permeating amount of nitrogen to a workpiece is to be set to a certain value under the conditions of 1.0 for the $a_C$ value and 9000 seconds for the execution period of the carbonitriding process, the target undecomposed ammonia concentration can be determined from the relationship represented in FIG. 11. Therefore, in the undecomposed ammonia concentration determination step, determination of whether the ammonia supplied amount adjustment step is to be executed or not can be made based on whether the ammonia concentration measured at the undecomposed ammonia concentration measurement step is equal to the target undecomposed ammonia concentration. The relationship required to determine the target undecomposed ammonia concentration is not limited to the above-described relationship between the undecomposed ammonia concentration and permeating amount of nitrogen. The relationship between the undecomposed ammonia concentration and the nitrogen concentration at a site of a predetermined depth from the surface of the workpiece may be employed.

Referring to FIG. 7, when the undecomposed ammonia concentration is not equal to the target undecomposed ammonia concentration, an ammonia supplied amount adjustment step of increasing or decreasing the undecomposed ammonia concentration in the heat treatment furnace is carried out. Then, the undecomposed ammonia concentration measurement step is carried out again. The ammonia supplied amount adjustment step can be carried out by adjusting the amount of ammonia flowing into the heat treatment furnace per unit time (flow rate of ammonia gas) from an ammonia gas cylinder coupled to the heat treatment furnace via a pipe using a flow rate control device including a mass flow controller attached to the pipe. Specifically, when the measured undecomposed ammonia concentration is higher than the target undecomposed ammonia concentration, the flow rate is reduced. When the measured undecomposed ammonia concentration is lower than the target undecomposed ammonia concentration, the flow rate is increased. Thus, the ammonia supplied amount adjustment step can be carried out. When there is a predetermined difference between the measured undecomposed ammonia concentration and the target undecomposed ammonia concentration in the ammonia supplied amount adjustment step, how much the flow rate is to be increased/decreased can be determined based on the relationship between the increase/decrease of the flow rate of ammonia gas and the increase/decrease of undecomposed ammonia concentration, determined empirically in advance.

In the case where the undecomposed ammonia concentration is equal to the target undecomposed ammonia concentration, an undecomposed ammonia concentration measurement step is carried out again without execution of the ammonia supplied amount adjustment step.

In the partial pressure control step, the partial pressure of at least one of CO and $CO_2$ is controlled by adjusting the supplied amount of propane ($C_3H_8$) gas, butane gas ($C_4H_{10}$) and the like, serving as enriched gas, to adjust the $a_C$ value, $C_P$ value and the like. Specifically, the carbon monoxide partial pressure $P_{CO}$ and the carbon dioxide partial pressure $P_{CO2}$ in the atmosphere are measured using an infrared gas concentration measurement apparatus. The supplied amount of propane ($C_3H_8$) gas, butane gas ($C_4H_{10}$) and the like serving as enriched gas is adjusted such that the $a_C$ value, $C_P$ value and the like are equal to respective target values based on the measured value.

In the case where the supplied amount of ammonia is modified and the partial pressure ratio that is the ratio of the partial pressure of carbon monoxide to the partial pressure of carbon dioxide changes, the partial pressure of at least one of carbon monoxide and carbon dioxide is modified in the undecomposed ammonia concentration control step so as to cancel the change of the partial pressure prior to modification of the supplied amount of ammonia to the partial pressure after the supplied amount of ammonia has been modified.

Figure 9:
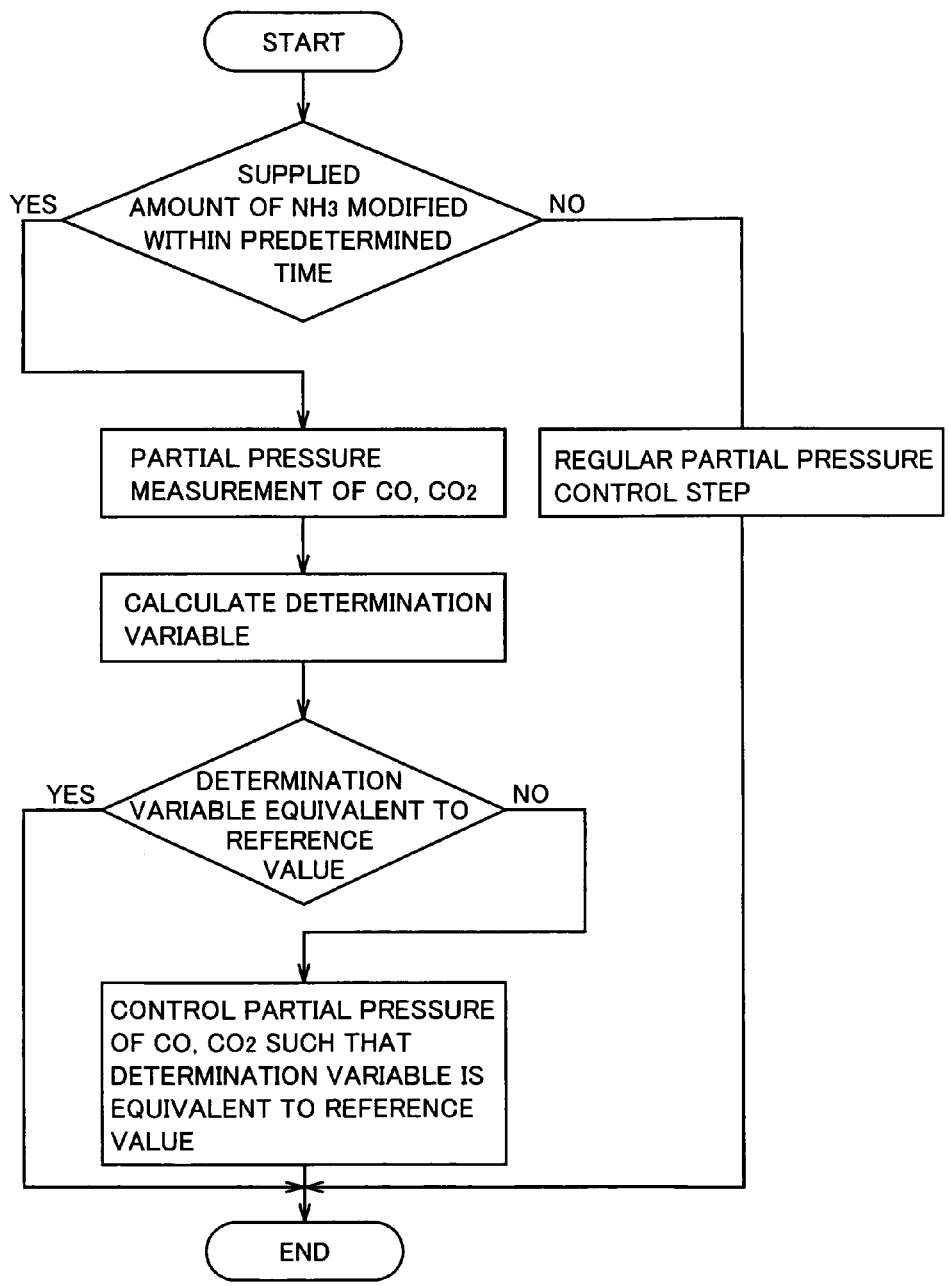
FIG. 9 represents an exemplified way of controlling the partial pressure ratio of carbon monoxide and carbon dioxide in the partial pressure control step included in the carbonitriding step of the second embodiment.

Specifically, as shown in FIG. 9, a supplied amount modification determination step of determining whether the supplied amount of ammonia has been modified within a predetermined period of time is carried out. It is to be noted that modification of the supplied amount of ammonia will cause change in the partial pressure of, for example, carbon monoxide. By determining in advance the aforementioned predetermined time in consideration of the time starting from modification of the supplied amount of ammonia up to the partial pressure of carbon monoxide being effected based on the capacity and the like of the heat treatment furnace, and by identifying whether the supplied amount of ammonia has been modified within the predetermined time or not, determination is made as to whether measurement of the partial pressure of carbon monoxide and carbon dioxide that will be described afterwards is required or not.

In the case where the supplied amount of ammonia is not modified within the predetermined time, the regular partial pressure control step that is the partial pressure control step of a normal mode is implemented. For example, the step of measuring the carbon monoxide partial pressure $P_{CO}$ and/or carbon dioxide partial pressure $P_{CO2}$ in the atmosphere at a predetermined interval, and adjusting the supplied amount of enriched gas so that the $a_C$ value, the $C_P$ value and the like attain the target values is implemented. Alternatively, the series of steps of executing partial pressure measurement of CO and $C_{O2}$ in FIG. 9 that will be described afterwards up to the step of controlling the partial pressures of CO and $CO_2$ such that the determination variable attains the reference values may be implemented at a predetermined interval. Then, the supplied amount modification determination step is carried out again.

In contrast, in the case where the supplied amount of ammonia is modified within the predetermined time, the partial pressure measurement step of measuring carbon monoxide partial pressure $P_{CO}$ and/or carbon dioxide partial pressure $P_{CO2}$ is carried out, followed by a determination variable calculation step of calculating determination variables such as a partial pressure ratio $P_{CO}/P_{CO2}$, $a_C$ value, $C_P$ value, and the like. Then, a determination variable determination step of determining whether the relevant determination variable is equivalent to a predetermined reference value is carried out. When the determination variables are equal to respective reference values, for example when the $C_P$ value that is a determination variable is equivalent to the reference value of 1.0, or within a predetermined tolerable range (for example, at least 0.95 and not more than 1.05), the present step corresponding to modification of the supplied amount of ammonia directly ends. In the case where the determination variable is not equivalent to the reference value, the step of controlling the partial pressures of CO and $CO_2$ is carried out so that the determination variable is equivalent to the reference value. For example, when $P_{CO}$ decreases and partial pressure ratio $P_{CO}/P_{CO2}$ that is a determination variable is lower than the reference value, the flow rate of enriched gas is modified to reduce $P_{CO2}$, for example, and restore partial pressure $P_{CO}/P_{CO2}$ to the reference value, so that the determination variable is equivalent to the reference value.

In the heating pattern control step, the heating history applied to the steel member that is a workpiece is controlled. Specifically, as shown in FIG. 8, the steel member is heated to a temperature of at least 800° C. and not more than 1000° C. that is a temperature of at least $A_1$ point, for example to 850° C., and maintained for a period of at least 60 minutes and not more than 300 minutes, for example 150 minutes, in the atmosphere controlled by the atmospheric control step set forth above. At the elapse of the maintaining period, the heating pattern control step ends. The atmospheric control step also ends at the same time.

Then, referring to FIG. 7, the steel member is immersed in oil (oil cooling) to be cooled from a temperature of at least $A_1$ point down to a temperature of not more than $M_S$ point. This corresponds to the cooling step. By the steps set forth above, the steel member has the surface layer subjected to carbonitriding as well as quench-hardening. Thus, the quench-hardening step of the second embodiment is completed.

According to the carbonitriding method of the second embodiment, carbon monoxide partial pressure $P_{CO}$ and/or carbon dioxide partial pressure $P_{CO2}$ in the atmosphere is measured for every predetermined interval and the supplied amount of enriched gas is adjusted so that the $a_C$ value, $C_P$ value, and the like are equivalent to the target values in a regular mode, whereas determination of the necessity of adjusting partial pressure ratio $P_{CO}/P_{CO2}$ is made when the supplied amount of ammonia is modified to modify the partial pressure of at least one of $P_{CO}$ and $P_{CO2}$ so that the $a_C$ value, $C_P$ value, and the like are equivalent to reference values. In other words, by reducing the partial pressure of at least one of $P_{CO}$ and $P_{CO2}$, when increased, by an amount corresponding to the increased level, or by increasing the relevant partial pressure, when decreased, by an amount corresponding to the decreased level, the change in partial pressure ratio $P_{CO}/P_{CO2}$ can be canceled. In addition, when one of the partial pressure is increased by just x % the partial pressure prior to modification of the supplied amount of ammonia, the other partial pressure is correspondingly increased by just x % the partial pressure prior to modification of the supplied amount of ammonia. When one of the partial pressure is decreased by just x % the partial pressure prior to modification of the supplied amount of ammonia, the other partial pressure is correspondingly decreased by just x % the partial pressure prior to modification of the supplied amount of ammonia. Thus, the change in partial pressure ratio $P_{CO}/P_{CO2}$ can be canceled. As a result, the $C_P$ value and $a_C$ value in the heat treatment furnace that directly affect the carburizing behavior on the workpiece can be controlled with favorable accuracy. Generation of a defective structure can be suppressed to allow the quality of the workpiece to be stabilized.

According to the carbonitriding method of the second embodiment, control is effected such that the undecomposed ammonia concentration is equivalent to the target concentration based on the measured value of the undecomposed ammonia concentration in the heat treatment furnace. Accordingly, the undecomposed ammonia concentration of the atmosphere in the heat treatment furnace can be controlled with favorable accuracy, facilitating control of the amount of nitrogen permeating into the workpiece at favorable accuracy.

In the carbonitriding method of the second embodiment, modification of the supplied amount of ammonia in the undecomposed ammonia concentration control step is preferably executed after the volume of the carburization gas at 20° C. and 1.05 atmospheric pressure, supplied to the heat treatment furnace subsequent to the previous modification of the supplied amount of ammonia effected immediately before modification of the supplied amount of ammonia, becomes equal to or exceeds the capacity of the heat treatment furnace.

Figure 10:
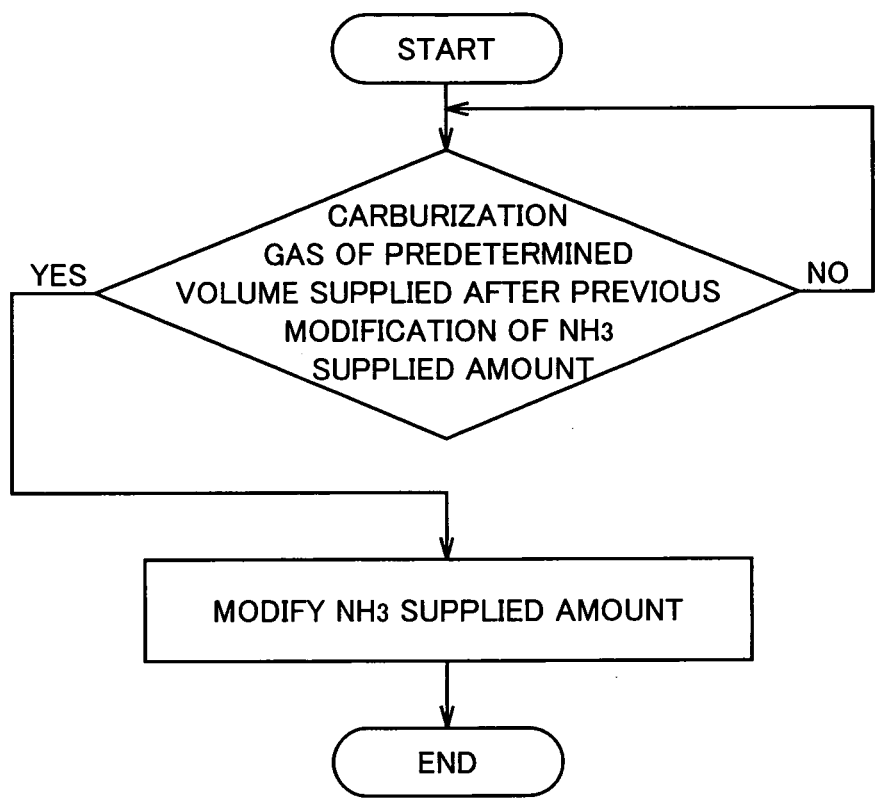
FIG. 10 represents an exemplified way of controlling the supplied amount of ammonia included in the ammonia supplied amount adjustment step of the undecomposed ammonia concentration control step in the carbonitriding step of FIG. 7 according to the second embodiment.

At the ammonia supplied amount adjustment step in the undecomposed ammonia concentration control step, the control set forth below is preferably implemented. Referring to FIGS. 7 and 10, at the ammonia supplied amount adjustment step shown in FIG. 7, a carburization gas supplied amount determination step of determining whether carburization gas of a predetermined volume, for example, a volume exceeding the capacity of the heat treatment furnace, has been supplied or not after the previous modification of the supplied amount of ammonia, is carried out, as shown in FIG. 10.

In the case where carburization gas of a volume exceeding the capacity of the heat treatment furnace has been supplied after the previous modification of the supplied amount of ammonia, the ammonia supplied amount adjustment step ends as the supplied amount of ammonia is modified. In the case where carburization gas of a volume exceeding the heat treatment furnace has not yet been supplied, modification of the supplied amount of ammonia is not executed, and the carburization gas supplied amount determination step is carried out again. Determination as to whether carburization gas exceeding a predetermined volume has been supplied or not can be made according to the time required for carburization gas of a predetermined volume to be introduced when the flow rate of carburization gas is constant. In the case where the flow rate of carburization gas changes, determination can be made based on accumulating the volume of carburization gas flowing in.

In the case where there is a change in the ammonia supplied amount of a level generally required for control of the undecomposed ammonia concentration, it is necessary to supply carburization gas of a volume exceeding the capacity of the heat treatment furnace at 20° C. and 1.05 atmospheric pressure in order to restore the partial pressure ratio between carbon monoxide and carbon dioxide to the state prior to change in the ammonia supplied amount. By implementing the ammonia supplied amount adjustment step set forth above, the ammonia supplied amount can be newly modified, subsequent to partial pressure ratio $P_{CO}/P_{CO2}$ being restored to the state prior to modification of the ammonia supplied amount. Therefore, control of the $C_P$ value, $a_C$ value, and the like is further facilitated, allowing generation of a defective structure to be further suppressed.

From the standpoint of further facilitating control of the $C_P$ value, $a_C$ value, and the like, it is preferable to execute modification of the ammonia supplied amount after carburization gas of at least two times, more preferably at least three times for further stabilization, the capacity of the heat treatment furnace has been supplied. On the other hand, in order to control the remaining ammonia concentration sufficiently, modification of the ammonia supplied amount is preferably executed after carburization gas of a volume not more that 4 times, preferably not more than 3 times, the capacity of the heat treatment furnace, has been supplied.

By implementing a stable carbonitriding process according to the fabrication method of a machinery component of the second embodiment set forth above, a machinery component having stable quality can be fabricated. The machinery component of the second embodiment has a stable quality by the implementation of a stable carbonitriding process.

Although a deep groove ball bearing, thrust needle roller bearing, and constant velocity joint are described as an example of machinery components of the present invention in the first and second embodiments, the machinery component of the present invention is not limited thereto, and may be another machinery component that requires fatigue strength and abrasion wear at the surface layer such as a hub, gear, or shaft.

Example 1

Example 1 of the present invention will be described hereinafter. An experiment to study the relationship between the $\gamma$ value and the permeating rate of nitrogen into the workpiece was carried out. The procedure of the experiment is set forth below.

The capacity of the heat treatment furnace employed for the experiment was 120 L (liter). The workpiece was a JIS SUJ2 (1 mass % of carbon content) ring having an outer diameter of $\Phi 38$ mm, an inner diameter of $\phi 30$ mm, and a width of 10 mm. This ring of 101 g (gram) in weight was placed in the heat treatment furnace. A heating pattern similar to that of FIG. 8 was employed, and the retention temperature of carbonitriding was 850° C. Taking the three levels of 0.76-1.24 for the $a_C$ value, the $\gamma$ value was varied by altering the $C_N$ value. By measuring the mass of nitrogen permeating during a carburizing time of 9000 seconds, the mass of nitrogen (unit: g) permeating through a 1 mm² surface of the workpiece per second, i.e. the nitrogen permeating rate (unit: g/mm²·second), was calculated. The permeating amount of nitrogen was measured by EPMA.

Figure 12:
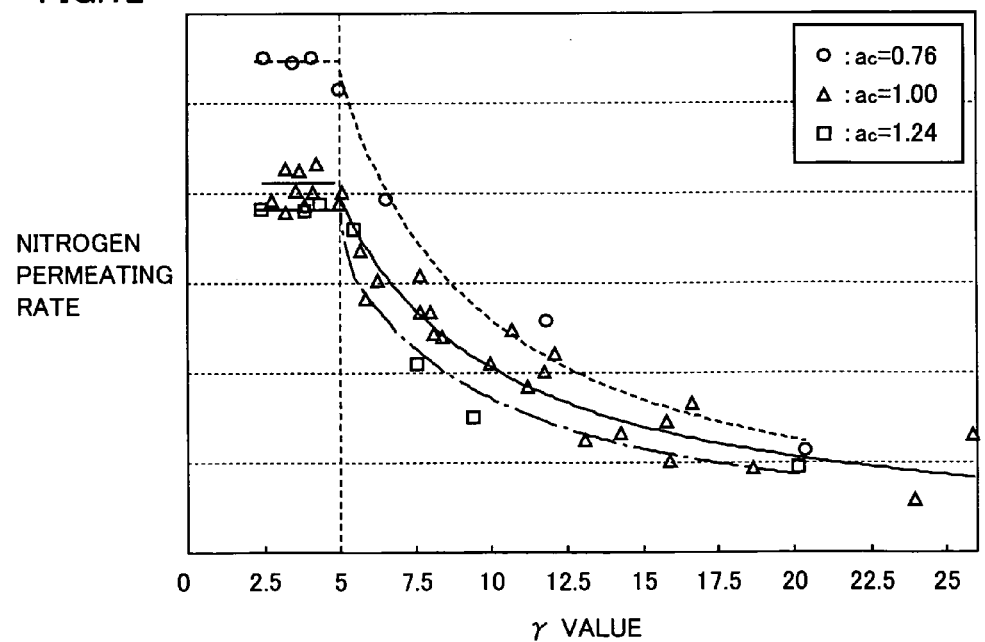
FIG. 12 represents the relationship between the γ value and nitrogen permeating rate corresponding to an $a_C$ value of three levels.

In FIG. 12, the $\gamma$ value is plotted along the horizontal axis and the nitrogen permeating rate is plotted along the vertical axis. The circle and dashed line correspond to the case where $a_C$ is 0.76, the triangle and solid line correspond to the case where $a_C$ is 1.05, and the square and dashed dotted line correspond to the case where $a_C$ is 1.24. The relationship of the $a_C$ value and $\gamma$ value to the nitrogen permeating rate will be described hereinafter with reference to FIG. 12.

Referring to FIG. 12, the permeating rate of nitrogen into the workpiece becomes higher as $a_C$ is smaller, when $\gamma$ is constant. In the case where $a_C$ is constant, the permeating rate of nitrogen into the workpiece becomes higher as $\gamma$ is smaller. The permeating rate of nitrogen into the workpiece becomes highest when the $\gamma$ value is 5. The nitrogen permeating rate becomes constant in the range where the $\gamma$ value is 5 or below. Therefore, by setting the $\gamma$ value to 5 or below, the permeating rate of nitrogen into the workpiece can be maximized.

Figure 13:
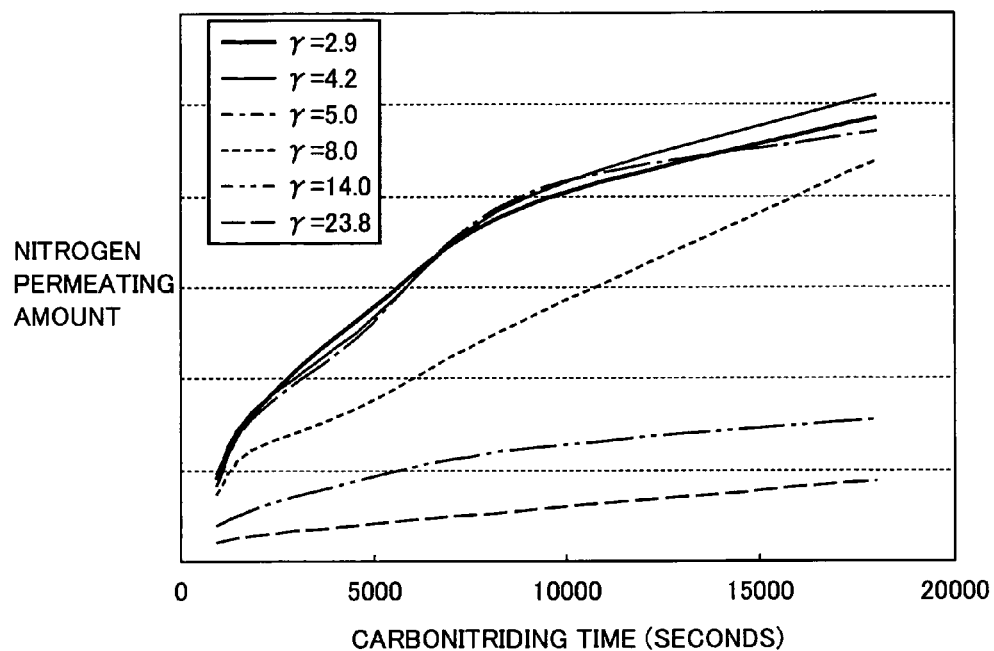
FIG. 13 represents the transition of the nitrogen permeating amount when the carbonitriding time and γ value are altered.

Under similar test conditions, an experiment of studying the nitrogen permeating amount when the carbonitriding time is altered was carried out. Six levels from 2.9 to 23.8 were set for the $\gamma$ value. In FIG. 13, the carbonitriding time is plotted along the horizontal axis, and the nitrogen permeating amount (unit: g/mm²) that is the mass of nitrogen permeating through a 1 mm² surface of the workpiece is plotted along the vertical axis. The bold solid line corresponds to the case where $\gamma$ is 2.9; the thin solid line corresponds to the case where $\gamma$ is 4.2, the dashed dotted line corresponds to the case where $\gamma$ is 5.0; the short dashed line corresponds to the case where $\gamma$ is 8.0, the dashed double-dotted line corresponds to the case where $\gamma$ is 14.0, and the long dashed line corresponds to the case where $\gamma$ is 23.8. Transition of the nitrogen permeating amount when the carbonitriding time and the $\gamma$ value are altered will be described with reference to FIG. 13 hereinafter.

Referring to FIG. 13, there is a trend of the nitrogen permeating amount increasing as the carbonitriding time increases, under any value of $\gamma$. The nitrogen permeating amount is increased as the $\gamma$ value becomes larger. It is to be noted, however, that the transition of the nitrogen permeating amount with respect to the carbonitriding time is substantially similar when the $\gamma$ value is 5.0, 4.2 and 2.9, i.e. when the $\gamma$ value is 5 or below. It is therefore appreciated that the transition of the nitrogen permeating rate according to the elapse of the carbonitriding time is substantially the same when the $\gamma$ value is 5 or below, in addition to the fact that the nitrogen permeating rate is the same up to the point of time of the carburizing time of 9000 seconds when the $\gamma$ value is not more than 5. Thus, it is appreciated that the permeating rate of nitrogen into the workpiece is maximized and a constant permeating behavior is exhibited by setting the γ value of the atmosphere in the heat treatment furnace to 5 or below in the carbonitriding process.

The results of experiments similar to those described above on workpieces formed of steel of different compositions indicate that the aforementioned nitrogen permeating behavior is exhibited noticeably in a workpiece formed of steel containing at least 0.8 mass % of carbon. Therefore, the carbonitriding method according to one aspect of the present invention taking advantage of the nitrogen permeating behavior set forth above can be effectively applied to a workpiece formed of steel containing at least 0.8 mass % of carbon. Steel containing carbon of at least 0.8 mass %, i.e. eutectoid steel and hypereutectoid steel, includes JIS SUJ2 serving as bearing steel, SAE52100 and DIN standard 100Cr6 equivalent thereto, as well as JIS SUJ3, and JIS SUP3, SUP4 serving as spring steel, JIS SK2, SK3 serving as tool steel, and the like.

Example 2

Example 2 of the present invention will be described hereinafter. An experiment to study the relationship between the carbonitriding time and the nitrogen concentration at a region of different depth from the surface of the workpiece when the γ value is set constant was carried out. The experiment procedure is set forth below.

The capacity of the heat treatment furnace used in the experiment was 120 L. The conditions in the experiment were basically similar to those of Example 1. Carbonitriding corresponding to various carbonitriding periods of time was carried out with 4.2 as the γ value. Then, the distribution of the nitrogen concentration in the direction of depth from the surface of the workpiece was measured by EPMA, and converted into the ratio (activity) of nitrogen in the steel to the solubility limit.

Figure 14:
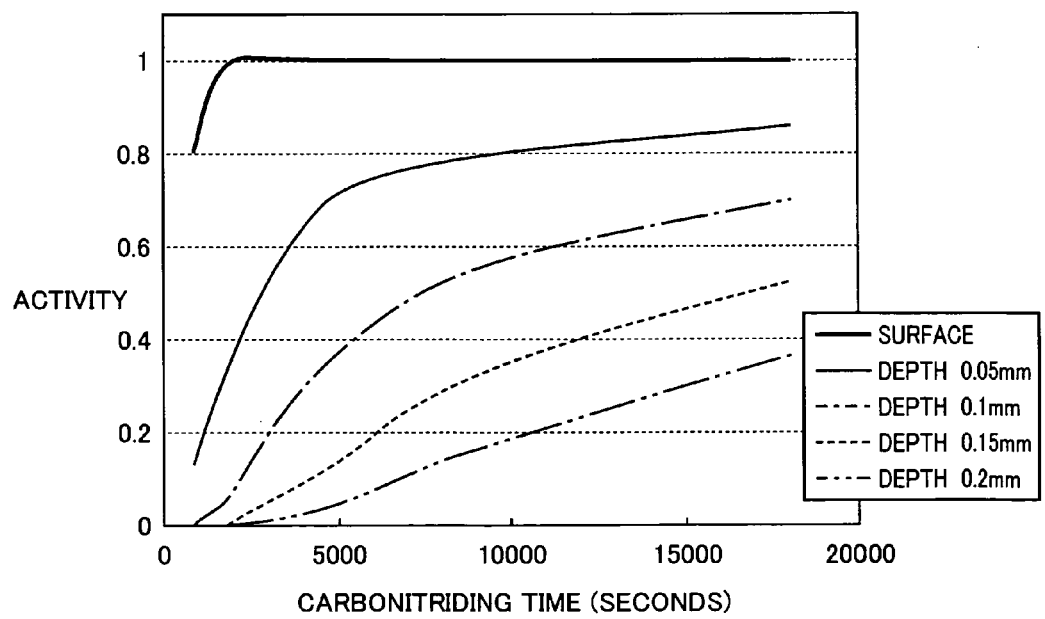
FIG. 14 represents the relationship between the carbonitriding time and nitrogen activity at respective depth of the workpiece.

In FIG. 14, the carbonitriding time is plotted along the horizontal axis, and the activity of nitrogen in the steel constituting the workpiece is plotted along the vertical axis. The relationship between the carbonitriding time and activity is represented by the bold solid line for the region at the surface, represented by the thin solid line for the region of 0.05 mm in depth, represented by the dashed dotted line for the region of 0.1 mm in depth, represented by the dashed line for the region of 0.15 mm in depth, and represented by the dashed double-dotted line for the region of 0.2 mm in depth. The relationship between the carbonitriding time and the nitrogen activity at different depth of the workpiece will be described with reference to FIG. 14 hereinafter.

Referring to FIG. 14, the nitrogen activity at the surface has reached the solubility limit at the carbonitriding time of 1800 seconds. More time is required to increase the activity as the depth becomes larger, and the ratio of activity increase to the carbonitriding time differs for respective depth. In a conventional carbonitriding method in which the nitrogen permeating rate could not be controlled, the relationship of FIG. 14 varies depending upon the $a_C$ value and $C_N$ value of the atmosphere. Therefore, in the case where the configuration and/or mass of the workpiece is varied and the $a_C$ value and $C_N$ value of the atmosphere change, it will be difficult to determine the carbonitriding time to obtain the desired nitrogen concentration at the desired depth from the relationship of FIG. 14. In contrast, according to the carbonitriding method of one aspect of the present invention, the change in the nitrogen permeating rate with respect to the carbonitriding time can be maintained constant by setting the γ value to 5 or below, as shown in FIG. 13, even if the configuration and/or mass of the workpiece is modified. Therefore, the relationship of FIG. 14 will not change unless the composition of steel constituting the workpiece is altered, even if the shape and/or mass of the workpiece is modified. As a result, the carbonitriding time to obtain the desired nitrogen activity at a desired depth can be determined from the relationship of FIG. 14 that is defined for each composition of the steel constituting the workpiece.

The vertical axis of FIG. 14 represents the nitrogen activity in the workpiece. The activity is the ratio of the nitrogen concentration to the solubility limit of nitrogen that is the physical property value determined for each material. Therefore, the nitrogen activity plotted the vertical axis in FIG. 14 and the nitrogen concentration have a one-to-one corresponding relationship. Thus, the carbonitriding time to obtain the desired nitrogen concentration at the desired depth can be determined from the relationship of FIG. 14. Alternatively, a diagram representing the relationship with the carbonitriding time plotted along the horizontal axis and the nitrogen concentration plotted along the vertical axis may be produced and used to determine the carbonitriding time required to achieve the desired nitrogen concentration at a desired depth.

According to the carbonitriding method of one aspect of the present invention, the change in the nitrogen permeating rate with respect to the carbonitriding time can be held constant. By determining in advance a relationship similar to that of FIG. 14 when the γ value is held at an arbitrary constant value for each composition of steel constituting the workpiece, the carbonitriding time required to achieve a desired nitrogen concentration at a desired depth can be determined.

Example 3

Example 3 of the present invention will be described hereinafter. An experiment to study the influence of the modification frequency of the ammonia supplied amount on the stabilization of the $C_P$ value was carried out. The experiment procedure is set forth below.

The capacity of the heat treatment furnace employed for the experiment was 120 L (liter). The workpiece was a JIS SUJ2 (1 mass % of carbon content) ring having an outer diameter of Φ38 mm, an inner diameter of Φ30 mm, and a width of 1 mm. This ring of 101 g (gram) in weight was placed in the heat treatment furnace. A heating pattern similar to that of FIG. 8 was employed, and the retention temperature of carbonitriding was 850° C. The ammonia gas supply flow rate was modified for every time interval $t_2$ while supplying carburization gas (mixture gas of RX gas and enriched gas) to the heat treatment furnace at a constant flow rate. By adjusting the enriched gas flow rate in accordance with the change in the carbon monoxide partial pressure $P_{CO}$ reflecting the modification of the ammonia gas supply flow rate, the carbon dioxide partial pressure $P_{CO2}$ was altered to maintain partial pressure ratio $P_{CO}/P_{CO2}$ as well as the $C_P$ value constant. The carburization gas, at 20° C. and 1.05 atmospheric pressure, was supplied to a heat treatment furnace of 120 L that is the capacity of the heat treatment furnace by time $t_1$. Based on three levels of $t_2$, the carbon monoxide partial pressure $P_{CO}$ and carbon dioxide partial pressure $P_{CO2}$ in the heat treatment furnace were measured to calculate the $C_P$ value by equations (1) and (3) to evaluate the stability of the $C_P$ value.

Figure 15:
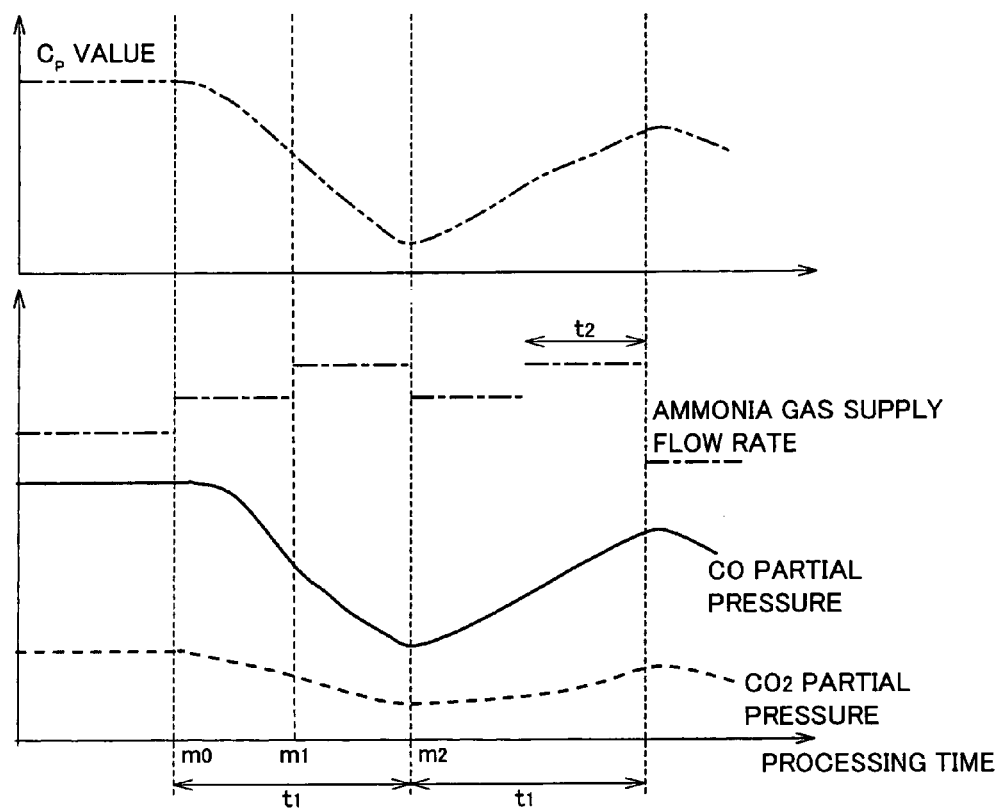
FIG. 15 represents the stability of the $C_P$ value when $t_2$ is set ½ $t_1$.
Figure 16:
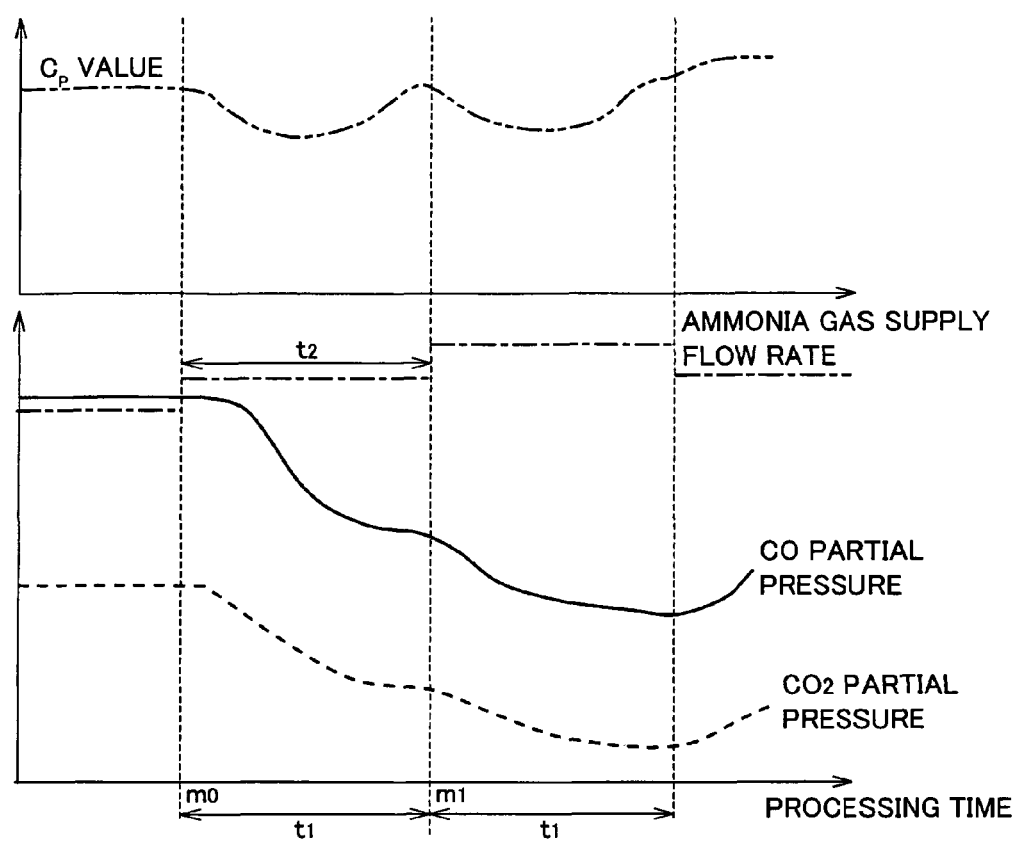
FIG. 16 represents the stability of the $C_P$ value when $t_2$ is set equal to $t_1$.
Figure 17:
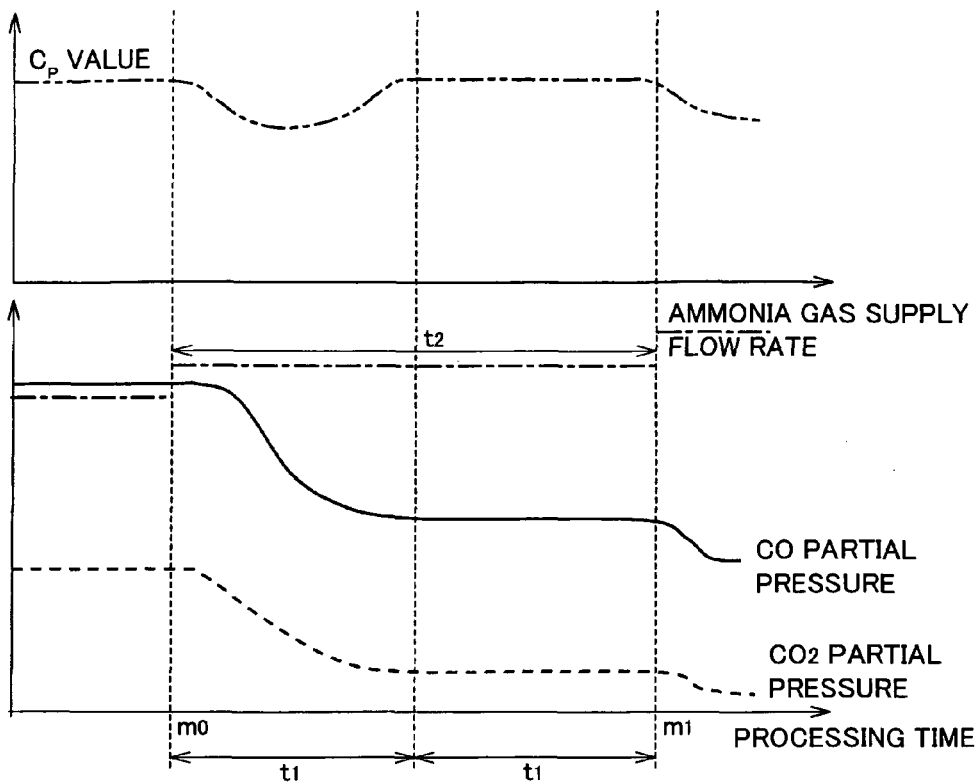
FIG. 17 represents the stability of the $C_P$ value when $t_2$ is set two times $t_1$.

In FIGS. 15-17, the horizontal axis represents the elapsing time of the carbonitriding process (processing time) with the elapse of the processing time in the rightward direction. In FIGS. 15-17, the vertical axis represents the partial pressure of carbon monoxide (CO), the partial pressure of carbon dioxide ($CO_2$), the ammonia gas supply flow rate, and the $C_P$ value, representing a higher value as a function of height. In FIGS. 15-17, the solid line represents the partial pressure of carbon monoxide, the dashed line represents the partial pressure of carbon dioxide; the dashed dotted line represents the ammonia gas supply flow rate; and the dashed double-dotted line represents the $C_P$ value. The experiment results of Example 3 will be described hereinafter with reference to FIGS. 15-17.

Referring to FIG. 15, the $C_P$ value that was maintained at the target value is reduced in response to reduction of the partial pressure of carbon monoxide corresponding to the increase of the ammonia gas supply flow rate at time m0 in the case where $t_2$ is set to ½ $t_1$, corresponding to a range outside the preferable scope of the embodiment of the carbonitriding method according to another aspect of the present invention. In view of this reduction, the flow rate of enriched gas is adjusted to reduce the partial pressure of carbon dioxide in order to cancel the change in the $C_P$ value (change in partial pressure ratio $P_{CO}/P_{CO2}$). However, at time m1 corresponding to the elapse of time $t_2$ from time m0, the ammonia gas supply flow rate is further increased. As a result, the $C_P$ value is further reduced without being restored to the target value (the value at m0).

In the carbonitriding method of FIG. 15, modification of the ammonia supply flow rate is executed before the volume of carburization gas at 20° C. and 1.05 atmospheric pressure supplied to the heat treatment furnace, subsequent to the previous modification of the ammonia supply flow rate, becomes equal to or larger than the capacity of the heat treatment furnace. Therefore, the ammonia gas supply flow rate is further varied without the $C_P$ value being restored to the target value. Therefore, control of the $C_P$ value is not feasible. It is difficult to maintain the $C_P$ value at the target value.

Referring to FIG. 16 corresponding to the case where $t_2$ is set equal to $t_1$ which is within the range of a preferable embodiment of the carbonitriding method according to another aspect of the present invention, the $C_P$ value maintained at the target value is reduced in response to the reduction of the partial pressure of carbon monoxide corresponding to increase of the ammonia gas supply flow rate at time m0. By adjusting the flow rate of the enriched gas to lower the partial pressure of carbon dioxide in order to cancel the change in the $C_P$ value (change in partial pressure ratio $P_{CO}/P_{CO2}$), the $C_P$ value is restored to the target value (the value at m0) at time m1 corresponding to an elapse of time $t_2$ from time m0.

Namely, in the carbonitriding method of FIG. 16, modification of the ammonia supply rate is executed simultaneous to the volume of the carburization gas, at 20° C. and 1.05 atmospheric pressure, supplied to the heat treatment furnace, subsequent to the previous modification of the ammonia supply flow rate, becoming at least the capacity of the heat treatment furnace. Therefore, the $C_P$ value is restored to the target value, and the ammonia gas supply flow rate further changes thereafter. Therefore, control of the $C_P$ becomes more feasible, and a carbonitriding process is executed with a more stable $C_P$ value, as compared to that of FIG. 15.

Referring to FIG. 17 corresponding to the case where t2 is set two times t1 that is within the range of a preferable embodiment of the carbonitriding method according to another aspect of the present invention, the $C_P$ value maintained at the target value is reduced in response to the reduction in the partial pressure of carbon monoxide corresponding to the increase of the ammonia gas supply flow at time m0. By adjusting the flow rate of the enriched gas to lower the partial pressure of carbon dioxide in order to cancel the change in the $C_P$ value (change in partial pressure ratio $P_{CO}/P_{CO2}$), the $C_P$ value is restored to the target value (the value at m0) at the point of time corresponding to an elapse of time $t_1$ from time m0. The $C_P$ value is maintained at the target value at approximately 50% the time of $t_2$ until time m1 corresponding to an elapse of time $2 \times t_1$.

Namely, in the carbonitriding method of FIG. 17, modification of the ammonia supply rate is executed simultaneous to the volume of the carburization gas, at 20° C. and 1.05 atmospheric pressure, supplied to the heat treatment furnace, subsequent to the previous modification of the ammonia supply flow rate, becoming at least two times the capacity of the heat treatment furnace. Therefore, the $C_P$ value is restored to the target value, and maintained at that level. The ammonia gas supply flow rate further changes thereafter. Therefore, control of the $C_P$ becomes more feasible, and a carbonitriding process is executed with a more stable $C_P$ value.

Figure 18:
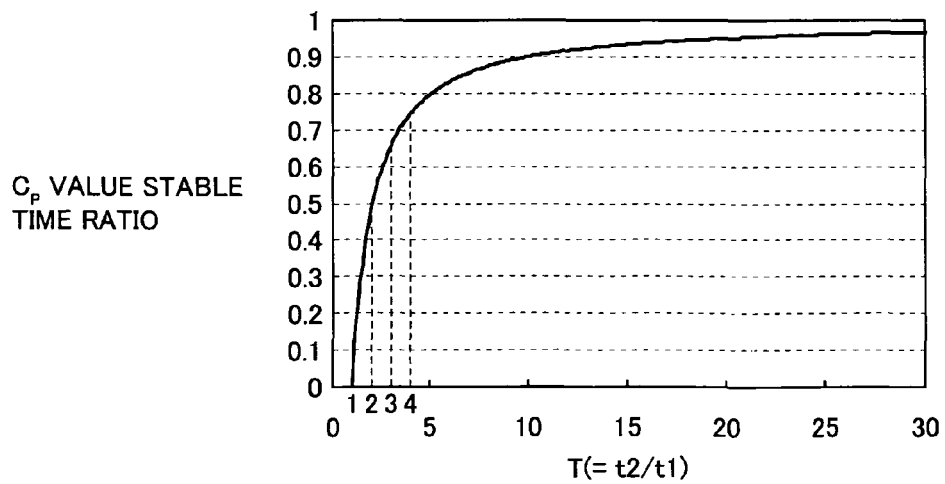
FIG. 18 represents the effect of a ratio T on a $C_P$ value stable time ratio, where ratio T is the ratio of a time $t_2$ before the ammonia gas supply flow rate is modified to a time $t_1$ required for carburization gas of a volume (20° C., 1.05 atmospheric pressure) equal to the capacity of the heat treatment furnace to be supplied thereto, and $C_P$ value stable time ratio is the ratio of the period of time the $C_P$ value is held at the target value to the carbonitriding process time.

The influence of T on the $C_P$ value stable time ratio will be described with reference to FIG. 18 hereinafter. In FIG. 18, the horizontal axis represents T ($=t_2/t_1$), and the vertical axis represents the $C_P$ value stable time ratio that is the ratio of the time during which the $C_P$ value is maintained at the target value to the carbonitriding process time.

Referring to FIG. 18, when T is below 1, the time during which the $C_P$ value is maintained at the target value is 0, and the $C_P$ value stable time ratio is 0. Therefore, control of the $C_P$ value in the carbonitriding process is not feasible when T is lower than 1. The $C_P$ value stable time ratio becomes higher as T becomes larger, facilitating control of the $C_P$ value. As shown in FIG. 18, in order to implement control of an appropriate $C_P$ value, T of at least 1, preferably at least 2 where the $C_P$ value stable time ratio exceeds 0.5 (that is, the $C_P$ value is maintained at the target value during at least 50% the period of the carbonitriding time) is to be set. Further, by setting T to at least 3, the $C_P$ value stable time ratio exceeds 0.65. It is appreciated that the $C_P$ value can be maintained at the target value during ⅔ the period of the entire carbonitriding time.

It should be understood that the embodiments and examples disclosed herein are illustrative and non-restrictive in every respect. The scope of the present invention is defined by the terms of the claims, rather than the description above, and is intended to include any modification within the scope and meaning equivalent to the terms of the claims.

INDUSTRIAL APPLICABILITY

The carbonitriding method and fabrication method of a machinery component of the present invention can be conveniently applied to the carbonitriding method of a member formed of steel and a fabrication method of a machinery component formed of steel. Moreover, the machinery component of the present invention is particularly suitable for a machinery component that requires fatigue strength and wear resistance.

The invention claimed is:

1. A carbonitriding method for carbonitriding a workpiece formed of steel containing at least 0.8 mass % of carbon, comprising:
    an atmosphere control step of controlling an atmosphere in a heat treatment furnace, and
    a heating pattern control step of controlling a temperature history applied to said workpiece in said heat treatment furnace,
    wherein said atmosphere control step comprises
    an undecomposed ammonia concentration control step of controlling an undecomposed ammonia concentration in said heat treatment furnace, and
    a partial pressure control step of controlling a partial pressure of at least one of carbon monoxide and carbon dioxide in said heat treatment furnace, in said atmosphere control step, said undecomposed ammonia concentration control step and said partial pressure control step are carried out such that a value of $\gamma$ defined by $\gamma = a_C/C_N$, where $a_C$ is an activity of carbon in said workpiece and $C_N$ is the undecomposed ammonia concentration in volume % in said heat treatment furnace, is in a range of at least 2 and not more than 5, wherein the undecomposed ammonia concentration is the concentration of ammonia remaining in a gaseous ammonia state without being decomposed in an atmosphere of said heat treatment furnace with respect to ammonia supplied to said heat treatment furnace.

2. The carbonitriding method according to claim 1, wherein, in said undecomposed ammonia concentration control step, the undecomposed ammonia concentration in said heat treatment furnace is measured, and said undecomposed ammonia concentration is compared with a target undecomposed ammonia concentration corresponding to said $\gamma$ value in the range of at least 2 and not more than 5 to adjust a flow rate of ammonia supplied into said heat treatment furnace.

3. The carbonitriding method according to claim 1, wherein said atmosphere control step is carried out such that a difference between a highest value and lowest value of said $\gamma$ value is not more than 1 during a period where said workpiece is retained at the temperature of at least $A_1$ point.

4. The carbonitriding method according to claim 1, wherein a period of time during which said workpiece is retained at the temperature of at least an $A_1$ point is determined based on a relationship of a carbonitriding time and said $\gamma$ value to a nitrogen concentration at a region of a predetermined depth from a surface of said workpiece, said relationship is determined for each composition of steel constituting said workpiece.

* * * * *